US011954126B2

(12) United States Patent
Srinivasan et al.

(10) Patent No.: US 11,954,126 B2
(45) Date of Patent: Apr. 9, 2024

(54) SYSTEMS AND METHODS FOR MULTI MACHINE LEARNING BASED PREDICTIVE ANALYSIS

(71) Applicant: ACCENTURE GLOBAL SOLUTIONS LIMITED, Dublin (IE)

(72) Inventors: Madhan Kumar Srinivasan, Bangalore (IN); Guruprasad Pv, Bangalore (IN); Samba Sivachari Rage, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 194 days.

(21) Appl. No.: 17/156,234

(22) Filed: Jan. 22, 2021

(65) Prior Publication Data
US 2022/0237208 A1 Jul. 28, 2022

(51) Int. Cl.
*G06F 16/28* (2019.01)
*G06F 16/25* (2019.01)
*G06F 16/26* (2019.01)
*G06N 20/00* (2019.01)

(52) U.S. Cl.
CPC .......... *G06F 16/283* (2019.01); *G06F 16/254* (2019.01); *G06F 16/26* (2019.01); *G06N 20/00* (2019.01)

(58) Field of Classification Search
CPC ...... G06F 16/283; G06F 16/26; G06F 16/254; G06N 20/00
USPC ........................................................ 707/736
See application file for complete search history.

(56) References Cited

U.S. PATENT DOCUMENTS

| 10,311,361 | B1* | 6/2019 | Durham | G06N 7/01 |
| 10,452,490 | B2* | 10/2019 | Pradhan | G06F 11/1451 |
| 10,887,188 | B2* | 1/2021 | Powell | G06N 20/00 |
| 11,361,197 | B2* | 6/2022 | Calmon | G06F 18/217 |
| 2015/0178811 | A1* | 6/2015 | Chen | G06Q 30/0631 705/26.7 |
| 2016/0219070 | A1* | 7/2016 | Vasseur | G06F 21/552 |
| 2019/0095801 | A1* | 3/2019 | Saillet | G06N 5/04 |
| 2019/0102693 | A1* | 4/2019 | Yates | G06N 20/00 |
| 2019/0347410 | A1* | 11/2019 | Kesarwani | G06F 21/52 |
| 2021/0092026 | A1* | 3/2021 | Di Pietro | H04L 61/5014 |

(Continued)

OTHER PUBLICATIONS

Matthias Feurer et al., "Auto-sklearn: Efficient and Robust Automated Machine Learning", In: "Gesture Recognition", May 18, 2019, 22 pages.

(Continued)

*Primary Examiner* — Son T Hoang
*Assistant Examiner* — Earl Levi Elias
(74) *Attorney, Agent, or Firm* — Mannava & Kang, P.C.

(57) ABSTRACT

The present disclosure relates to systems and methods for carrying out predictive analysis where a plurality of data sets may be ingested from a data lake. A data analyzer may tag the ingested data sets, detect redundant occurrence of multiple attributes such as, a row, a column, and a list in the tagged data set. The data analyzer may eliminate the detected redundant multiple attributes. Further, a model selector and evaluator may execute a machine learning (ML) model to conduct predictive analysis on the data set. The execution may be done based on a predefined set of instructions stored in a database. The executed ML model may be validated upon determining that the predictive analysis yields a positive response for the transformed data set.

18 Claims, 25 Drawing Sheets

(56) References Cited

U.S. PATENT DOCUMENTS

2021/0256420 A1\* 8/2021 Elisha ...................... G06N 5/04
2021/0295191 A1\* 9/2021 Bui ...................... G06V 10/751
2022/0156175 A1\* 5/2022 Periyathambi .......... G06F 40/20

OTHER PUBLICATIONS

Radwa Elshawi et al., "Automated Machine Learning: State-of-the-Art and Open Challenges", arxiv.org, Jun. 5, 2019, 23 pages.

Anh Truong et al., "Towards Automated Machine Learning: Evaluation and Comparison of AutoML Approaches and Tools", 2019 IEEE 31st International Intelligence (ICTAI), Nov. 4, 2019, pp. 1471-1479.

Karansingh Chauhan et al., "Automated Machine Learning: The New Wave of Machine Learning", Proceedings of the Second International Conference on Innovative Mechanisms for Industry Applications (ICIMIA 2020), pp. 205-212.

\* cited by examiner

ML Model List

ML Techniques

☐ K-Means
☒ HistGradient
☐ SGDClassifier
☐ KNN
☐ Iterative Dichotomizer3
☐ Apriori ☒ LightGBM
☐ CatBoost
☐ Naïve Bayesian
☐ SVM
☐ Linear Regression
☒ Logistic Regression ☐ Regression Tree
☒ Decision Tree
☐ Random Forest
☐ AdaBoost
☒ Gradient Boosting
☐ XG-Boost Submit | <Back | Cancel | Help

*FIG. 9H*

SYSTEMS AND METHODS FOR MULTI MACHINE LEARNING BASED PREDICTIVE ANALYSIS

BACKGROUND

Big Data, Machine Learning (ML), and Internet of Things (IoT) are concepts that are widely utilized in almost every smart technology. These concepts have paved for progress in multiple technological fields. Internet of things (IoT) may be considered as a system of inter-related computing devices, and mechanical/digital machines provided with unique identifiers (UIDs) that have an ability to transfer data over a network without requiring human-to-human or human-to-computer interaction. For example, IoT may refer to billions of physical devices around the world that are now connected to the Internet, all collecting and sharing data. Connecting these different devices and associating sensors with them incorporate a level of digital intelligence in the devices, which would otherwise be unintelligent. IoT enables these heterogeneous devices to communicate real-time data without involving human beings. IoT is therefore making the fabric of the world around us smarter and more responsive by merging digital and physical universes.

The term "big data" may refer to data that is so large, fast, or complex that it may be difficult or impossible to process using traditional methods. The act of accessing and storing large amounts of information for analytics has been around a long time. However, the concept of big data gained momentum in the early 2000s. Big data can be understood with the 4V definition as follows:

Volume: A characteristic that makes data "big" is the sheer volume. Data may be collected from a variety of sources, including business transactions, Smart (IoT) devices, industrial equipment, videos, social media and much more. In the past, storing such huge data would have been a problem, but cheaper storage on platforms such as, for example, data lakes and Hadoop have eased the burden.

Velocity: With the growth in the Internet of Things, data streams into businesses at an unprecedented speed, and must be handled in a timely manner. RFID tags, sensors, and smart meters are driving the need to deal with these torrents of data in near-real-time.

Variety: Data may be presented in all types of formats from structured, numeric data in traditional databases to unstructured text documents, emails, videos, audios, stock ticker data, and financial transactions.

Veracity: Data veracity, in general, indicates how accurate or truthful a data set may be. It is not just the quality of the data itself, but how trustworthy the data source, type, and processing of it is. Removing things such as, for example, bias, abnormalities or inconsistencies, duplication, and volatility are just a few aspects that factor into improving the accuracy of big data.

The role of big data in IoT may be to process a large amount of data in real-time and store it using different storage technologies.

Machine learning is a sub-field of computer science and is a type of Artificial Intelligence (AI) that provides machines with an ability to learn without explicit programming. Machine learning has evolved from pattern recognition and computational learning theory. Machine learning (ML) algorithms typically learn a ML model from input data, which allows systems to build and improve predictions. Most ML algorithms require a subject matter expert (SME) to guide on model assortment, and explain how, for each ML model, prediction conclusions on a particular problem are done, as such information is not readily available in various scenarios. Even with a SME, complexity of an issue can often lead to sub-optimal choices in the ML strategy. Different problems can be solved with different ML algorithms, and therefore, choosing the right ML algorithm (also interchangeably referred to as ML technique hereinafter), and tuning the parameters/settings of the ML model play a vital role in the quality of predictions. In sum, given the number of available ML models, deciding as to which ML model would suit a specific problem (by considering the data), is not an easy task.

ML models (also interchangeably referred to as ML system hereinafter) that are configured on particular public clouds may be bound to those clouds. Therefore, if a user uses a machine-learning (ML) model on cloud A, data storage mechanism on cloud A will typically be natively supported by the respective ML model. However, the user's enterprise database may not be supported by the ML model unless the user provides data integration between its on-premises data storage system and data storage mechanism on the cloud. Moreover, if the user is working with hybrid-cloud or multi-cloud deployments, separation of data from the ML model will be problematic in terms of performance, cost, and usability. ML models can therefore, as a result, be a loss leader as they are designed to rigidly attach enterprises to specific respective clouds.

Integrating data from disparate data sources can also pose hurdles. Many ML models rely on data that comes from different sources/places. Collecting all such data and transforming it so that is usable can be a difficult task, irrespective of whether an entity is using a cloud based ML model or another type of ML solution.

Accordingly, there is a requirement to provide an architecture that recommends a ML model or a combination of ML models for predictive analysis of data based on the type of data to be analyzed. Additionally, there is a requirement to provide a solution for pre-processing data input from one or more user data sources so that the processed data can be analyzed to recommend an appropriate AI algorithm and an optimal ML model for the data. There is also a requirement to be able to continuously train the architecture based on the selected ML model(s) and the addition of new ML models for possible use.

An example embodiment of the present disclosure pertains to a system for predictive analysis. The proposed system may include a processor, a data lake, a data analyzer, and a model selector and evaluator. The data lake includes large volume of data sets, from which a plurality of data sets are ingested. Each data set of the data lake may include at least one of data tables, data sheets, and data matrices. Each of the data tables, the data sheets, and the data matrices may have a plurality of attributes including at least one of a row, a column, and a list.

In an example embodiment, the data analyzer may tag at least one data set of the plurality of ingested data sets, and encode the tagged data set into a pre-defined format. The encoded data set may have a machine-readable format. The data analyzer may then process the encoded data set to detect redundant occurrence of the plurality of attributes in each of the data tables, the data sheets, and the data matrices of the encoded data set, wherein the detected redundant plurality of attributes may be eliminated. The data analyzer may then execute a first set of instructions on the encoded data set to obtain a transformed data set.

A model selector and evaluator may, based on a second set of instructions, execute a ML model to conduct predictive analysis on the transformed data set. Based on a confirmation that the predictive analysis yields a positive response for the transformed data set, the executed ML model may be validated.

Another example embodiment of the present disclosure pertains to a method for predictive analysis. The method can include the step of ingesting, from a data lake having large volume of data sets, a plurality of data sets. Each data set of the data lake may include at least one of data tables, data sheets, and data matrices. Each of the data tables, the data sheets, and the data matrices may have a plurality of attributes including at least one of a row, a column, and a list.

An example method can further include the step of configuring a data analyzer to tag at least one data set of the plurality of ingested data sets, and encode the tagged data set into a pre-defined format. The encoded data set may have a machine-readable format. The method can further include the step of enabling the data analyzer to process the encoded data set so as to detect redundant occurrence of the plurality of attributes in each of the data tables, the data sheets, and the data matrices of the encoded data set, wherein the detected redundant plurality of attributes may be eliminated. The method can further include the step of configuring the data analyzer to execute a first set of instructions on the encoded data set to obtain a transformed data set.

An example method of the present disclosure can include the step of configuring a model selector and evaluator to, based on a second set of instructions, execute a ML model to conduct predictive analysis on the transformed data set. Based on a confirmation that the predictive analysis yields a positive response for the transformed data set, the proposed method can enable validation of the executed ML model.

The present disclosure further pertains to a non-transitory computer readable medium comprising machine executable instructions that are executable by a processor. Upon such execution of the machine executable instructions, the processor ingests, from a data lake having large volume of data sets, a plurality of data sets. Each data set of the data lake may include at least one of data tables, data sheets, and data matrices. Each of the data tables, the data sheets, and the data matrices may have a plurality of attributes including at least one of a row, a column, and a list. The processor may further execute the machine executable instructions to configure a data analyzer to tag at least one data set of the plurality of ingested data sets, and encode the tagged data set into a pre-defined format. The encoded data set may have a machine-readable format. The data analyzer may further be configured to process the encoded data set so as to detect redundant occurrence of the plurality of attributes in each of the data tables, the data sheets, and the data matrices of the encoded data set, wherein the detected redundant plurality of attributes may be eliminated. The data analyzer can further be configured to execute a first set of instructions on the encoded data set to obtain a transformed data set.

The processor may further execute the machine executable instructions to configure a model selector and evaluator to, based on a second set of instructions, execute a ML model to conduct predictive analysis on the transformed data set. Based on a confirmation that the predictive analysis yields a positive response for the transformed data set, validation of the executed ML model can be performed.

BRIEF DESCRIPTION OF DRAWINGS

FIGS. 9A to 9H illustrate implementation of the proposed system for predictive analysis from data scientist perspective, according to an example embodiment of the present disclosure.

DETAILED DESCRIPTION

Figure 1:
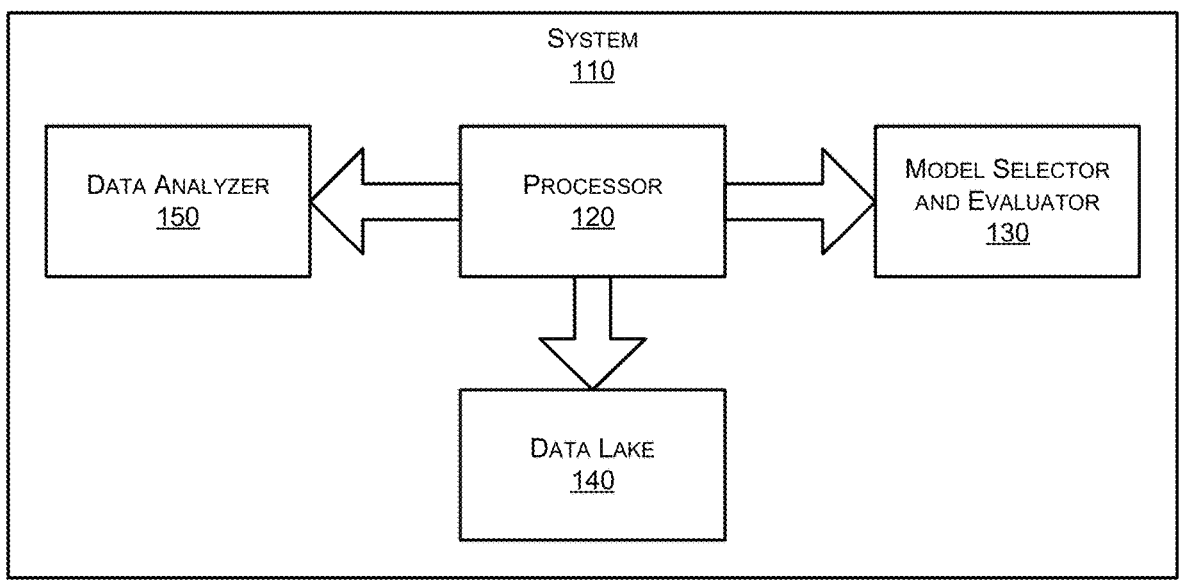
FIG. 1 illustrates a system for predictive analysis, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

Various embodiments describe providing a solution for ingesting a plurality of data sets from a data lake, and processing and analyzing the ingested data sets so as to select an optimal ML model for predictive analysis of the plurality of data sets.

An example embodiment of the present disclosure pertains to a system for predictive analysis. The proposed system may include a processor, a data lake, a data analyzer, and a model selector and evaluator. The data lake includes large volume of data sets, from which a plurality of new data sets may be ingested. Each data set of the data lake may include at least one of data tables, data sheets, and data matrices. Each of the data tables, the data sheets, and the data matrices may have a plurality of attributes including at least one of a row, a column, and a list.

In an example embodiment, the data analyzer may tag at least one data set of the plurality of ingested data sets, and encode the tagged data set into a pre-defined format. The encoded data set may have a machine-readable format. The data analyzer may then process the encoded data set to detect redundant occurrence of the plurality of attributes in each of the data tables, the data sheets, and the data matrices of the encoded data set, wherein the detected redundant plurality of attributes may be eliminated. The data analyzer may then execute a first set of instructions on the encoded data set to obtain a transformed data set.

Model selector and evaluator may, based on a second set of instructions, execute a ML model to conduct predictive analysis on the transformed data set. Based on a confirmation that the predictive analysis yields a positive response for the transformed data set, the executed ML model may be validated.

The proposed system may also include a performance evaluator to assess/validate performance of a ML model for the transformed data set by any or a combination of regularization regression and/or bias-variance tradeoff techniques. Such performance can be assessed based on factors including, but not limited to, interpretability, simplicity, speed, and stability of the ML model for the transformed data set. Based the assessed performance, the chosen ML model may be validated.

The present disclosure describes a system for facilitating predictive analysis of data sets that are ingested from a data lake. The ingested data sets can be pre-processed and transformed into a machine-readable format. Any or a combination of feature detection and elimination, feature scaling, and dimensionality reduction of the pre-processed data sets may then be carried out, such that the resultant plurality of data sets consume minimal memory and multiple executions can be run on them with optimum speed and within minimal time. System of the present disclosure can then select a ML model for analyzing the resultant data set, based on which performance of the selected ML model can be validated. Upon validation, predictive analysis can accordingly be carried out on the data set.

Exemplary embodiments of the present disclosure have been described in the context of optimizing accuracy of predictive analysis of a data set that is not restricted only to data being associated with or generated by IT organizations, but can be applied to data sets handled by a majority of corporations for their financial, human resources, sales, marketing, manufacturing, or supply chain based data transactions. It will be appreciated that embodiments and concepts described herein may be applied in other scenarios, for example, to data sets associated with or generated by manufacturing organizations that may have a requirement of carrying out predictive analysis of raw material demand, inventory levels, projected sales, and supply chain requirements, among other data-intensive applications.

FIG. 1 illustrates a system 110 for predictive analysis, according to an example embodiment of the present disclosure. The system 110 may be implemented by way of a single device or a combination of multiple devices that are operatively connected or networked together. The system 110 may be implemented in hardware or a suitable combination of hardware and software.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, processor 120 may fetch and execute computer-readable instructions in a memory operationally coupled with system 110 for performing tasks such as data tagging, data processing input/output processing, feature extraction, and/or any other functions. Any reference to a task in the present disclosure may refer to an operation being or that may be performed on data.

As illustrated, the system 110 may be a hardware device including a processor 120 executing machine readable program instructions to ingest a plurality of data sets from a data lake 140. Each of the ingested plurality of data sets may include any of one or more data tables, data sheets, and data matrices. Each of the one or more data tables, data sheets, and data matrices may include a plurality of attributes.

Execution of the machine readable program instructions by the processor can further enable the proposed system to configure a data analyzer 150 to tag at least a data set of the plurality of ingested data sets, and encode the tagged data set into a pre-defined format such that the encoded data set has a machine readable format. In an aspect, tagging may be performed in multiple runs throughout the process at different time intervals to assist in time/speed efficient and accurate processing of the data sets. Data analyzer 150 may further be configured to detect redundant occurrence of the plurality of attributes in each of the one or more data tables, data sheets, and data matrices of the encoded data set, and eliminate the detected redundant plurality of attributes.

Processor 120 of the present disclosure can further execute a first set of instructions on the encoded data set to obtain a transformed data set. A ML model may then be selected by a model selector and evaluator 130 based on the encoded data set. The selected ML model may be executed by the proposed system to conduct predictive analysis on the transformed data set, wherein the execution can be done based on a predefined second set of instructions that may be stored, for instance, in a database maintained at the model selector and evaluator 130. Based on the execution of the selected ML model, the ML model can be validated upon confirming that the predictive analysis yields a positive response for the transformed data set.

In an example embodiment, the processor 120 may be coupled to a model selector and evaluator 130, a data lake 140, and a data analyzer 150. The data lake 140 may be a central repository and may correspond to storing metadata information received from several devices and obtained from multiple entities. The stored metadata information may be consumed by available intelligent units of the proposed system 110 for further processing. Further, the plurality of data sets stored in the data lake 140 may include any or a combination of one or more data tables, data sheets, and data matrices, each having a plurality of attributes including at least one of a row, a column, and a list.

The model selector and evaluator 130 may include multiple ML models, and various sets of instructions that can be executed to select an optimal ML model for the ingested data set(s). Further, the selected ML model may be executed to conduct a predictive analysis on the transformed data set, wherein the execution may be performed based on pre-defined second set of instructions. Upon determining that the predictive analysis yields a positive response for the transformed data set, the model selector and evaluator 130 may validate the executed ML model. On the other hand, upon determining that the predictive analysis yields a negative response for the transformed data set, the model selector and evaluator 130 may invalidate the executed ML model and proceed to select/execute another ML model and validate its performance.

Figure 2:
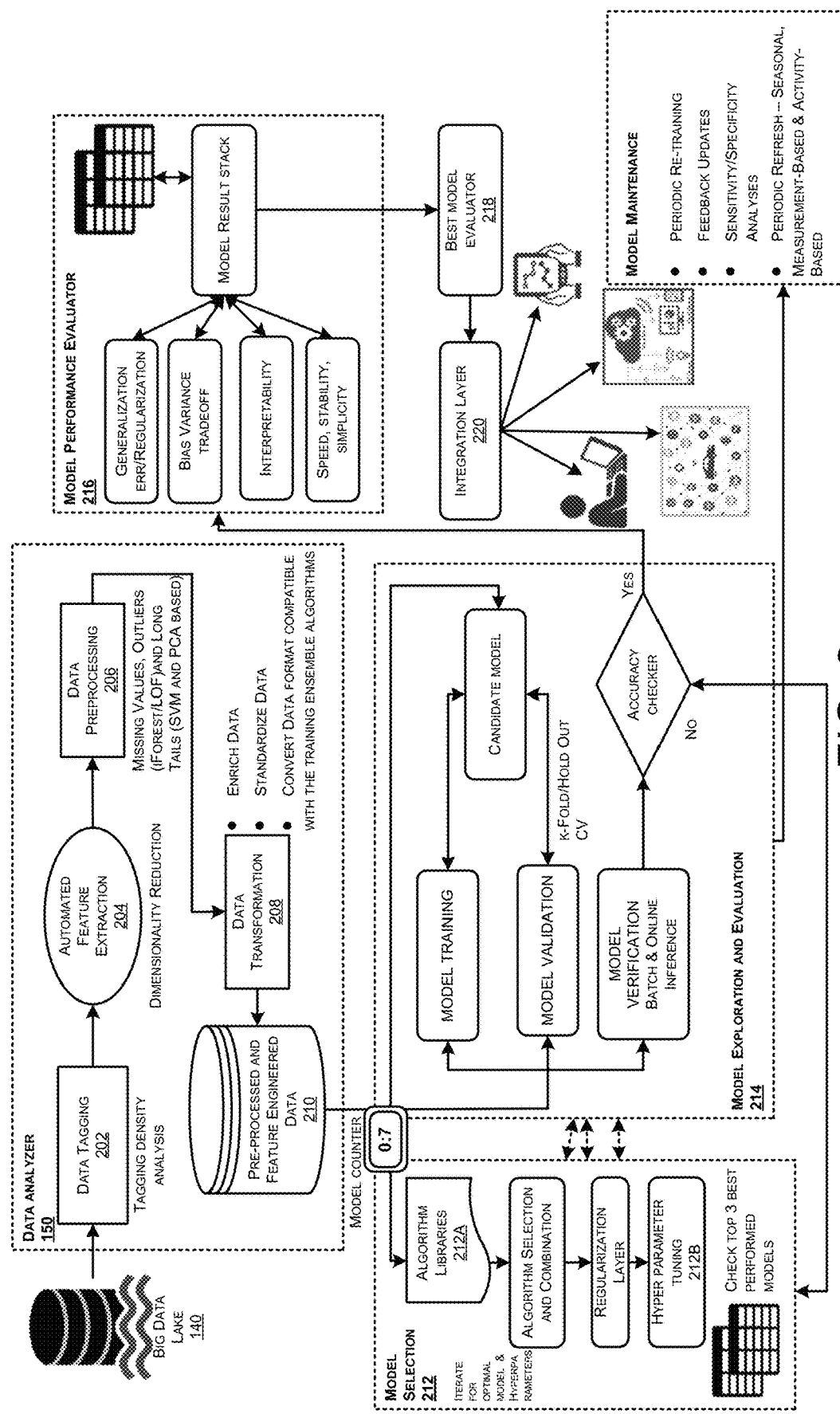
FIG. 2 illustrates components of the system of FIG. 1, according to an example embodiment of the present disclosure.

FIG. 2 illustrates components of the system 110 of FIG. 1, according to an example embodiment of the present disclosure. The system 110 may include an input module coupled to the data lake 140 that may facilitate ingestion of the plurality of data sets pertaining to raw files from the data lake 140. The raw files may include, for example, a billing file and a utilization metric file. Upon receipt of the raw files, parameter selection interface of the system 110 may allow a user to select its/his/her role. For example, the user can be a data scientist and/or a business analyst (business user), based on which specific parameters may be selected and associated/assigned with/to the received raw files/ingested plurality of data sets.

Data analyzer 150 can be configured to receive and facilitate tagging 202 of the ingested data sets. In an example, both input and output data sets may be labeled/tagged for classification to provide a learning basis for future data processing, particularly for supervised learning. In an example embodiment, tags may be assigned to the ingested data sets that are received from various heterogeneous cloud platform sources such as, but not limited to, Amazon Web Services (AWS), Azure, and Google Cloud Platform (GCP), and based on the data tagging, an optimal ML model can be identified and executed for the respective ingested data sets in order to provide fine-tuned predictions within minimal time and through minimal noise. In an instance, a user may tag the ingested data sets with several inputs associated with, but not limited to, the business entity, business line, division, and department. The tagging helps ensure that the ML model, based on previous executions, chooses optimal workflow parameters, which in turn, provides significant improvement in the performance of the ML model.

Data tagging may be useful in determining the type(s) of ingested data sets and in undertaking density analysis, which can help the model selector and evaluator 130 to identify/select an appropriate ML model for processing of the ingested data sets. In an example embodiment, a user may enter tagging details based on a business process lookup for a predefined training time. Further, the user may also select/configure parameters associated with the ingested data sets, such as, but not limited to, threshold for accuracy, new relevant variables, and prediction error range for upper and lower limit range, such parameters subsequently being factored into by the model selector and evaluator 130 to identify/select a candidate ML model for the data set in context. As would be appreciated, such tagging may be performed in multiple runs throughout the process at different time intervals to assist in time/speed efficient and accurate processing of the data sets.

In an example embodiment, post the tagging, the tagged data sets may be encoded, for instance, in a manner such that the system 110 can parse the encoded data sets. This enables features of the data sets to be easily interpreted by the selected/identified ML model, wherein the features can include, but are not limited to, redundant occurrence of attributes in each of the one or more data tables, data sheets, and data matrices of the encoded data sets.

Data analyzer 150 can be configured to facilitate automated feature extraction 204 while solving problems related to redundant features. Data analyzer 150 can enable feature selection, and therefore can help locate redundant occurrence of attributes of data sets. Based on such location, the data analyzer 150 can enable elimination of the redundant occurrence that may, in turn, facilitate in reduction of memory utilized in the whole process and increase processing speed as the size of the data sets is minimized. Moreover, dimension reduction and transformation of the data sets may be executed as a part of the automated feature selection, and may be carried out using techniques including, but not limited to, rank transformation, Pearson's correlation coefficient, Spearman's rank coefficient, Kendall's rank coefficient, Chi-Squared test, Power functions, and Principal Component Analysis (PCA).

In an example embodiment, dimensionality reduction may be defined as a process of reducing dimensionality of the feature space by obtaining a set of principal features. The higher the number of features, the harder it may get to visualize the training set and work on the features. At times, most of the features may be correlated, and hence may be determined as redundant and thereby may be eliminated, wherein such elimination may be performed using techniques including, but not limited to, PCA, Backward Feature Elimination, Forward Feature Construction, Missing Values Ratio, High Correlation Filter, and Baseline technique. In an example embodiment, PCA may be utilized for elimination of redundant features.

Data analyzer 150 may further perform data pre-processing 206 for carrying out any or a combination of missing value treatment, outlier treatment, data transformation, and scaling of the ingested/encoded data sets for handling problems associated with the data sets such as missing values, anomalies for dirty/noisy data, outliers, and the like. As most of the ML models require all features of the data sets to be complete, missing values must be dealt with, and accordingly the proposed system 110 can impute a value of the missing features, and thereby provide an appropriate substitute for the missing features. Common imputations can be carried out using mean, median, or mode of the available features. In an example embodiment, system 110 may accommodate a tolerance limit of say 10% 'missing values' in order to make predictions and may use missing value techniques, such as, but not limited to, K-nearest neighbors (KNN), Multiple Imputation by Chained Equations (MICE), Hot Deck, Cold deck, Interpolation and extrapolation, and Mean.

In an example embodiment, an outlier may be defined as an observation point that is distant from other observations. An outlier value may also be defined as a value that is separate/different from the crowd. System 110 may use advanced ML-based outlier algorithm(s) such as iForest based on the nature of outliers (global vs local outliers). A Local Outlier Factor (LOF) algorithm, for instance, can be used in local outlier detection. A two-layer progressive ensemble method for outlier detection may also be incorporated to accurately detect outliers in complex datasets with low time complexity.

In an example embodiment, as part of the pre-processing 206, data analyzer 150 may utilize iForest technique with low complexity to quickly scan the data sets, and may prune apparent normal data sets, and then may generate an outlier candidate data set. In order to further improve the pruning accuracy, the outlier coefficient may be introduced to design a pruning threshold setting technique, that may be based on outlier degree of the data sets. Thereafter, LOF algorithm may be applied to further distinguish the outlier candidate data set and obtain more accurate outliers. The proposed ensemble technique may provide respective advantages of the two algorithms and thereby may concentrate valuable computing resources on the key stage. The outlier treatment can be user-based, and may be carried out using techniques including, but not limited to, Mean, Mode, Median, Winsorizing, iForest, LOF, Z-score, Interquartile range (IQR), and Least median of squared residuals (LMS).

In another example embodiment, the ingested/pre-processed data sets may not be in the appropriate format or may require transformations to make them more useful. Data analyzer 150 can be configured to transform the ingested data sets to enrich the data set by performing standardization of the data sets, and conversion of format to make the data sets compatible with training ensemble algorithms. Data transformation may be utilized to make a data variable in a linear format wherein the chosen data variable may be tested for linearity using tests for normality and skewedness. Data transformation may be carried out using techniques including, but not limited to, categorical encoding, dealing with skewed data, bias mitigation, scaling, rank transformation, square/cube Root, base e/base10, and box-cox transformation.

In yet another example embodiment, the data sets may be scaled for obtaining better results. ML models typically execute algorithms that process numbers, and therefore in case there is a vast difference in the range of numbers associated with the data sets, such as, for example, a few ranging in thousands and few ranging in tens, such a vast difference may yield an underlying assumption that higher ranging numbers have superiority. As a result, the more significant numbers (assumed) may start playing a more decisive role while training the model. Some of the default scaling techniques that can be used by the proposed system 110 may include, but are not limited to, Min-max scaling, K-Means, Z-Score Standardization, and KNN.

Variable discretization may be defined as a process through which continuous variables present in the data sets may be transformed into a discrete form. In an example embodiment, variable discretization may be done by creating a set of contiguous intervals (or bins) that may be of equal intervals divided and spread across range of the desired variable/model/function. The variable discretization may be done through at least one of the techniques including Ameva, CICC, CAIM, and the likes. The data analyzer 150 may, at pre-processed and feature engineered data 210, store the processed data sets at a database that may act as a repository.

Model selector and evaluator 130 can be configured to manage and control multiple machine learning (ML) models along with their corresponding algorithm libraries. In an example embodiment, model selector and evaluator 130 can be configured to, through model selection block 212, identify/select a ML model that is optimally suited for processing and undertaking predictive analysis of the processed/encoded data sets, and libraries 212A associated with the selected ML model may be maintained, including versioning thereof. Further, at hyper-parameter tuning sub-block 212B of the model selection block 212, ML model hyper-parameter(s) may be configured and tuned with the processed/encoded data sets. The hyper-parameter(s) may be defined as a configuration that is external to the ML model, and whose value cannot be estimated from the data sets. Techniques such as Grid search and Bayesian Optimization may be used to tune the hyper-parameters.

Model selector and evaluator 130 may include two sections, i.e., model selection section/block 212 and model exploration and evaluation section/block 214. Both the blocks 212 and 214 can function in synchronization with each other, wherein the model selection block 212 may facilitate selection of an optimal ML model from a set of pre-stored/available ML models for processing the received data sets. Model selection block 212 may therefore provide a candidate ML model that has best-suited parameters for processing the data sets and, for which, hyper-parameter tuning may be carried out.

Model selector and evaluator 130 may include, for instance, twenty (20) available ML models. However, when a new ML model is required to be implemented within the system 110, the new model may initially be tested with a sample data set, and then trained with a training data set. Results and performance evaluation metrics obtained by execution of the new ML model may subsequently be validated by matching with a validation data set such that upon successful validation, the new ML model may be maintained at the model selector and evaluator 130. In an example embodiment, a cross-validation technique may be used to test-and-train and then validate a new ML model. During this process, the sample data set may randomly be split up into 'n' groups, say into two groups, where one of the groups may be used as a test data set, and the other group may be used as training data set. The candidate ML model that is forwarded from the model selector section 212, may be trained on the training data set and scored on the test data set. Subsequently, the ML model may be validated based on the determined performance metrics and accuracy of the generated predictive analysis.

In an example embodiment, when system 100 is implemented for predictive analysis of fraud detection, model exploration and evaluation block 214 can be configured to split the corresponding data set into training data set and test data set. The candidate ML model that is forwarded from the model selector block 212 can be trained and tested using the training data set and test data set, and performance metrics pertaining to anomalous data detection, false positives, and deployment time may be determined. Accuracy of the determined performance metrics may be compared with an accuracy threshold such that if the accuracy is found to be equal to or exceed the accuracy threshold, the candidate ML model may be validated.

System 110 of the present disclosure can further include a model performance evaluator 216 that can be configured to maintain results and performance evaluation metrics obtained for each ML model. Such results and performance evaluation metrics can be maintained keeping in context factors including, but not limited to, generalization, regularization, trade-off, speed, stability, simplicity, and the like. System 110 of the present disclosure can further include a best model evaluator 218 that can be configured to evaluate, based on the performance evaluation metrics and results obtained for each ML model, from a list of shortlisted/tested ML models, the best/most optimal ML model to deploy for the processed/encoded data set. System 110 of the present disclosure can further include an integration layer 220 to enable deployment of the optimal/chosen ML model to running applications and other web targets.

In an aspect, model selector and evaluator 130 can be configured to analyze the processed data set(s) such that based on utilization, high cost, and low performance, optimized predictions may be suggested through the ML model. The suggested predictions may be written back to a cloud database (DB). One or more suggested predictions may also be used for obtaining decision making solutions. ML models may accordingly be trained from input data sets that allow the proposed system 110 to build and improve predictions.

The proposed system 110 may facilitate in selection of an optimal ML model, and usage of the selected ML model for undertaking prediction analysis for cloud based data sets. Performance of the proposed system 110 is independent of the complexity of the problem and/or the involved data sets, and the system 110 can accordingly assist in building generalized performance for various input and learning tasks. Further, the proposed system 110 may be configured to handle all the problems, and solve them in an automated way by identifying/selecting an optimal ML model within given limited resources or constraints.

In an example embodiment, from a set of several available advanced ML models, an optimal ML model may be chosen by the proposed system 110 based on factors including, but not limited to, an ability of the ML model to capture constant metamorphosis of input data sets, i.e., the ability to "learn" from constant change in input data, prediction accuracy of the ML model, ability of the ML model to capture long term and short-term trends and seasonality, training time (the lower the better) and performance (execution speed) of the ML model, requirement of amount and type of available data by the ML model, and length of forecast horizon.

Figure 3:
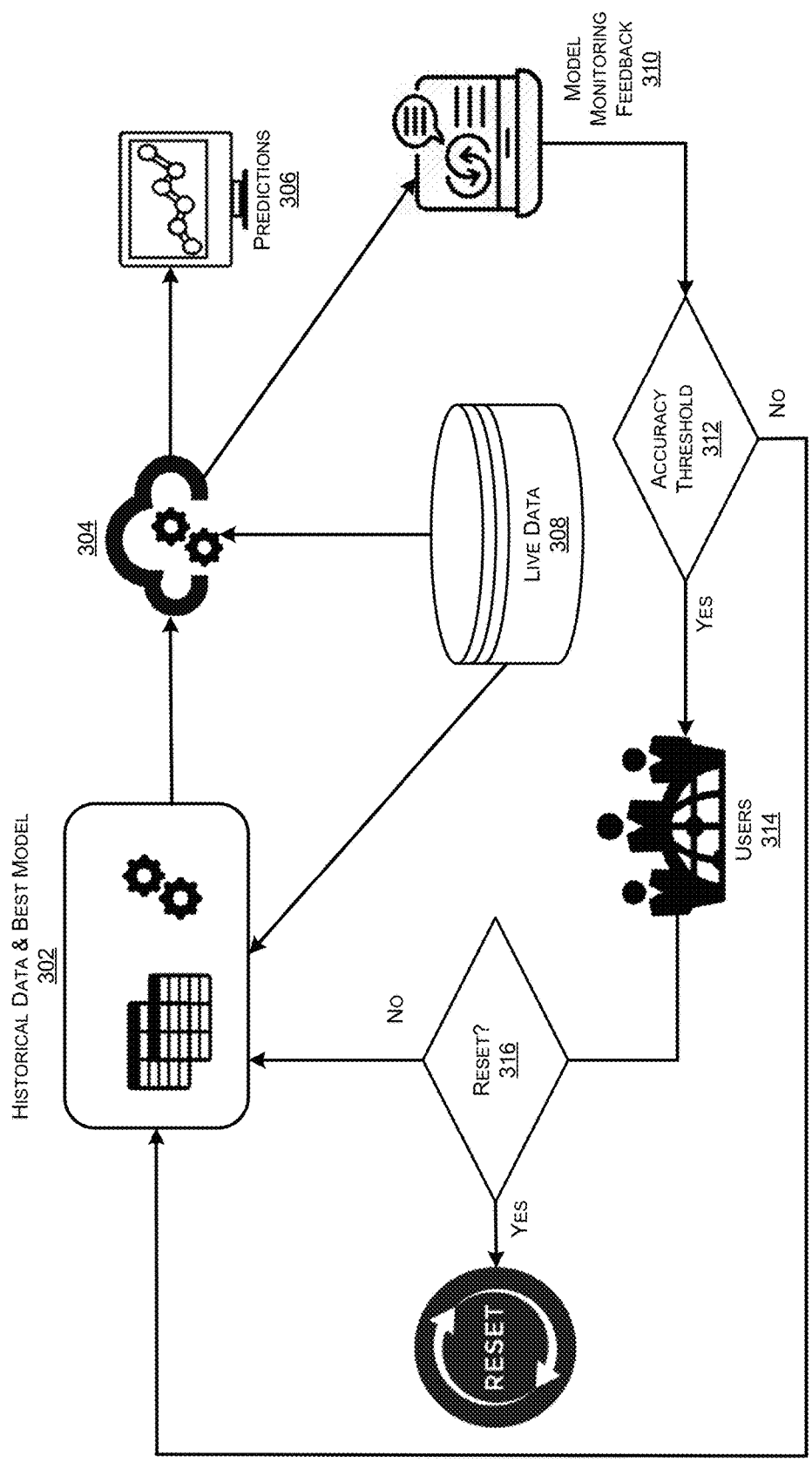
FIG. 3 illustrates a flow diagram showing maintenance of ML model at the system of FIG. 1, according to an example embodiment of the present disclosure.

FIG. 3 illustrates a flow diagram showing maintenance of ML model at system 110, according to an example embodiment of the present disclosure. System 110 of the present disclosure can be configured to select an optimal ML model for predictive analysis of live data sets present at 308. These data sets may be obtained from a data lake 140 or can be provided by a user. Selection of the optimal ML model can be based on historical data and/or related performance metrics and accuracy results that may be stored in a database such as 302. At block 304, the ingested/received live data sets may be pre-processed by, for example, eliminating redundant features of the live data sets and/or based on processing parameters defined by the user. Upon pre-processing of the data sets, the proposed system 110 may execute predictive analysis at 306 of the data sets using the selected ML model.

The pre-processed data sets along with corresponding results and performance metrics may be fed to a model monitoring feedback block 310 that can be configured to match, at block 312, accuracy of the obtained results and performance metrics with a defined accuracy threshold. In case the accuracy of the obtained results and performance metrics is found to match/meet with the defined accuracy threshold, the obtained results and performance metrics may be transmitted to users 314, such as, for example, a data scientist or a business analyst. Such users can utilize the live data sets and obtained results and performance metrics for further requirements. At block 316, a decision can be taken on whether the devices associated with the pre-processing of the data sets and performance of the predictive analysis need to be reset for a fresh data set in iteration.

However, in case the accuracy of the obtained results and performance metrics is not found to be in line with the defined accuracy threshold, system 110 may select and execute a second ML model or a combination of more than one ML models for predictive analysis of the live data sets. In addition, the pre-processed data sets along with corresponding results and performance metrics may be fed again to the model monitoring feedback block 310 that can be configured to match the accuracy of the obtained results and performance metrics with the defined accuracy threshold. The process can therefore be performed iteratively until the accuracy of the obtained results and performance metrics matches with the defined accuracy threshold.

Figure 4:
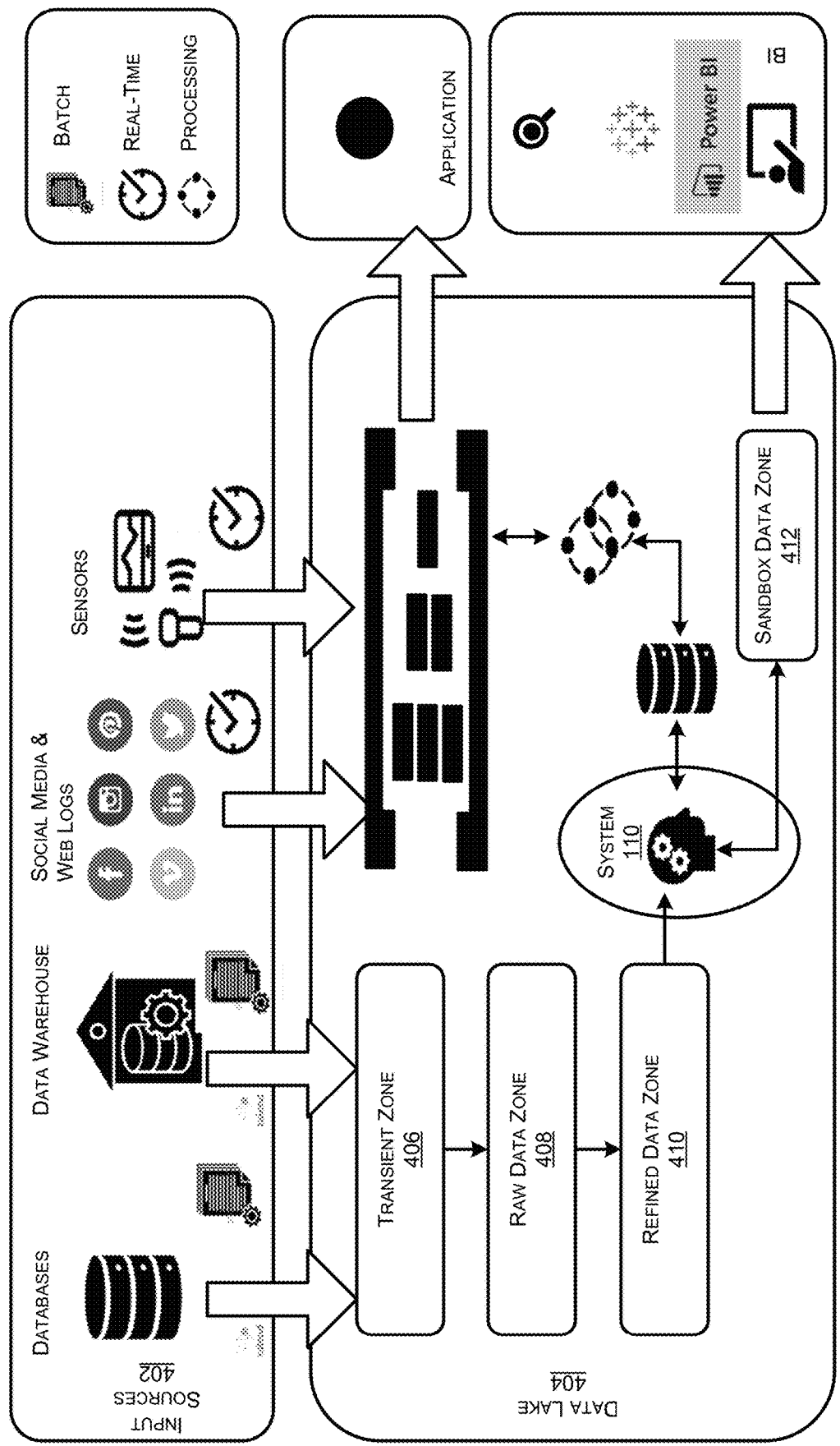
FIG. 4 illustrates an architecture diagram of data transformation layer of the system, according to an example embodiment of the present disclosure.

FIG. 4 illustrates an architecture diagram of data transformation layer of system 110, according to an example embodiment of the present disclosure. Data sets may be acquired from input sources 402 including, but not limited to, database(s), data warehouse(s), social media, web log(s), sensor(s), among other data sources. The acquired data sets/raw data may be maintained in a big data lake 404. Processing of the data sets can subsequently be performed by extracting the data sets from the data/input sources 402 such as databases and data warehouses, in, for example, a batch mode using ETL (Extract, Load, Transform) Tools such as Talend, Datastage, and Apache Nifi. Data sets can also, for example, be extracted IoT Sensors, Social media, Web Logs in near real-time using tools such as Apache Kafka, and Apache Flume.

In an example embodiment, Transient Zone 406 may be configured to hold ephemeral data, such as temporary copies, streaming spools, or other short-lived data before being ingested. Raw Data Zone 408 may be defined as a zone in which the raw data can be maintained. In the raw data zone 408, sensitive data may be encrypted, tokenized, or otherwise secured. Refined Data Zone 410 may be configured to maintain manipulated/processed and enriched data. For instance, the refined data zone 410 may be used to store output from tools such as Hive or external tools that may write into to the data lake 404.

In an example embodiment, events from IoT sensors, or streaming data from social media may be ingested into Hadoop data lake using an Event Hub that can be implemented using Apache Kafka, Azure Event Hub, Apache Flume, among other like tools. The streaming data may then be processed in Spark and transformed and stored in Real-Time Data Stores (Apache Hbase, Cassandra).

In another example embodiment, data sets from the refined data zone 410 and real-time data sets, for example, from social media, web logs, and sensors may be ingested into data analyzer 150 that can help process/encode the data sets. Such processed/encoded data sets can then be executed through a selected ML model to generate output pertaining to predictive analysis on the processed/encoded data sets. Such output and/or performance results/parameters associated with the ML model may then be stored in databases and data warehouses associated with the input sources 402 and sandbox zone 412. Databases and data warehouses associated with the input sources 402 may further facilitate in providing the results/output to downstream applications. In an example embodiment, sandbox data zone 412 may act as an input to the proposed system 110. For example, reporting tools can access data from the sandbox data zone 412 for further tuning, if required. Once data sets from data lake 404 are ingested into the system 110, the system 110 enables selection of a ML model with a lowest error rate and highest accuracy. The selected ML model may be validated for accuracy based on a user-defined universal criteria such as Root Mean Square Error (RMSE), mean absolute error (MAE), mean absolute percentage error (MARE), and confusion matrix.

Figure 5A:
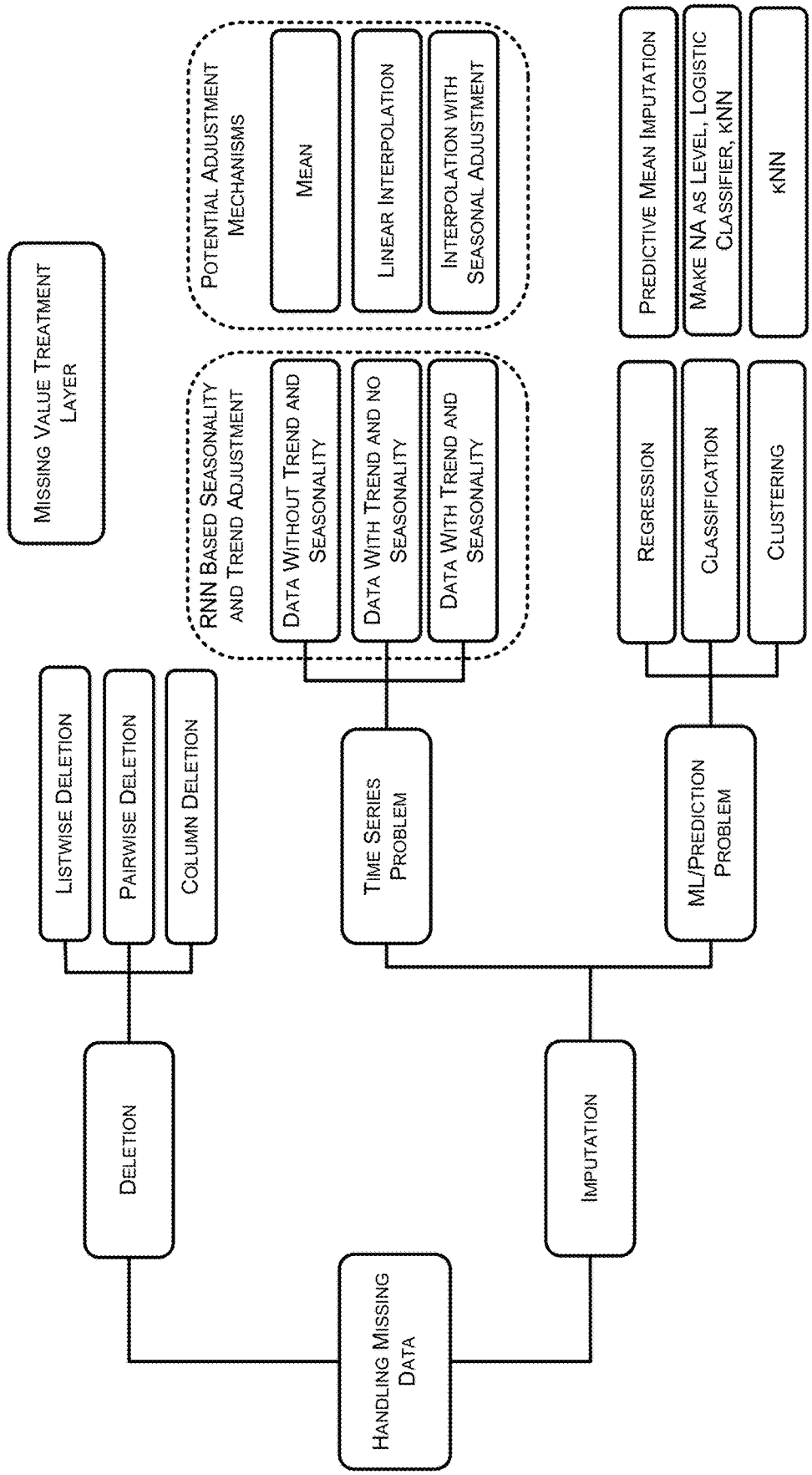
FIG. 5A is a flow chart of missing value treatment layer, according to an example embodiment of the present disclosure.
Figure 5B:
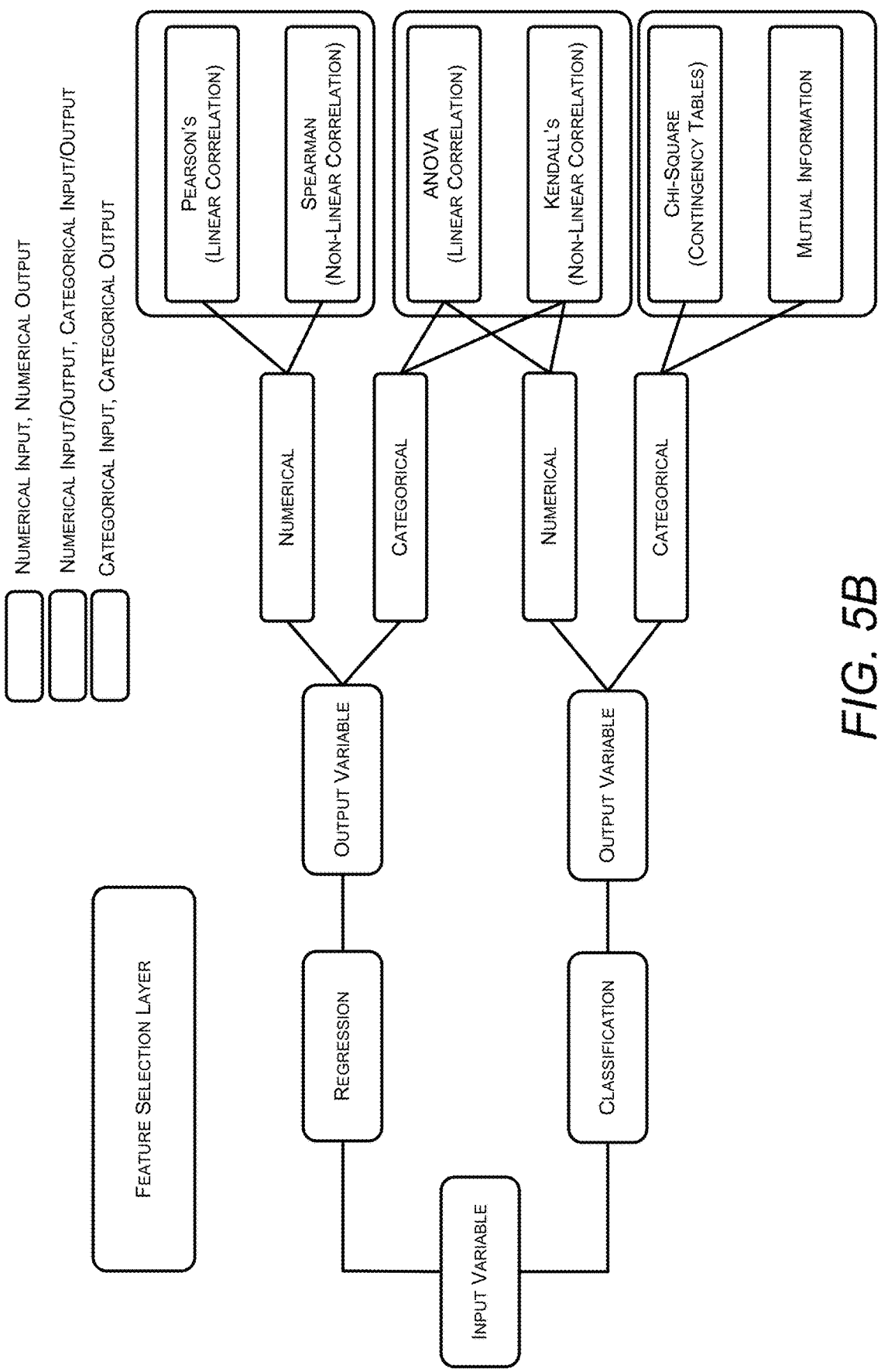
FIG. 5B is a flow chart of feature selection layer, according to an example embodiment of the present disclosure.
Figure 5C:
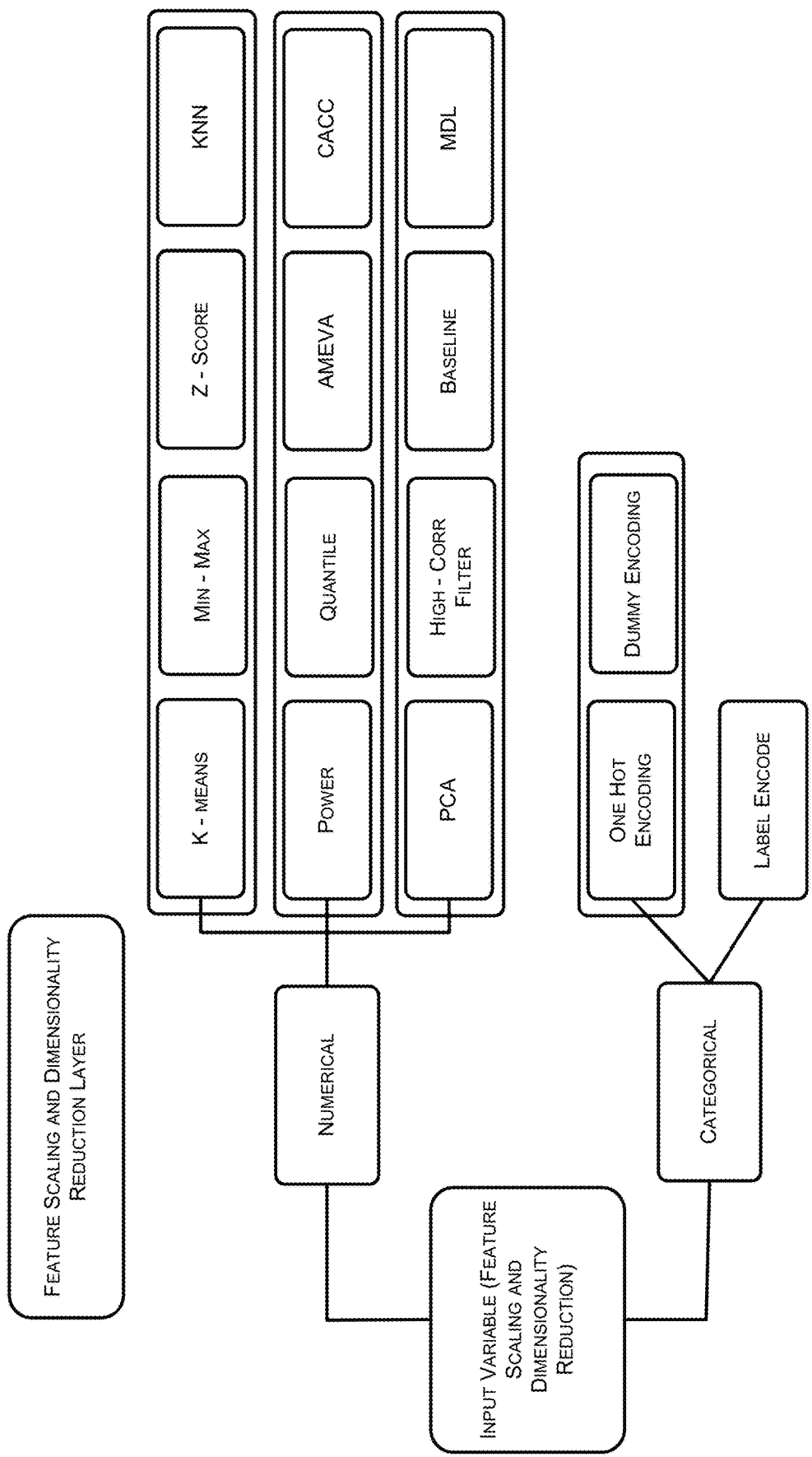
FIG. 5C is a flow chart of feature scaling and dimensionality reduction layer, according to an example embodiment of the present disclosure.

FIGS. 5A, 5B, and 5C illustrate flow charts of missing value treatment layer, feature selection layer, and feature scaling and dimensionality reduction layer respectively, according to an example embodiment of the present disclosure. In an example embodiment, system 110 may use a certain set of default/best techniques for data pre-processing. For example, for Outlier Detection, system 110 may use advanced ML-based techniques such as iForest and LOF techniques that can identify/process local and global outliers. However, for certain data pre-processing steps such as Feature Scaling, Feature Selection or Dimensionality Reduction, that more than one technique, the proposed system 110 may iteratively select every technique during initial runs and then select an optimal "path" based on the overall performance that may include accuracy, execution time, and errors. Once, the best "path" is finalized, it may be tagged as well for future runs. FIG. 5A illustrates how, during processing of data sets, missing data can be handled, wherein the data can be missing owing to deletion or imputation. In the case of data imputation, depending on whether the imputation is because of time-series problem or ML model/prediction problem, an appropriate technique (such as RNN based seasonality and trend adjustment, interpolation, mean based adjustment mechanism, regression, classification, clustering, predictive mean imputation, among others) can be implemented.

Recurrent neural network (interchangeably referred to as RNN) is a type of artificial neural network that utilizes a deep learning algorithm to detect anomalous data points within time series. A RNN such as a Long Short-Term Memory network may facilitate explicit handling of an order between observations while learning a mapping function from inputs to outputs along with addition of a sequence, where an addition of a new dimension to a function is approximated. Instead of mapping inputs to outputs alone, the RNN can learn a mapping function for the inputs over time to outputs. RNN may consist of an input layer, a hidden layer, and an output layer. Nodes within the hidden layer may be responsible for handling internal state and memory, thereby updating the internal state and the memory when a new input is fed into the RNN. The internal state of RNN can be used to process sequence of the input, and an important feature of the memory is that it can automatically learn the time-dependent features.

System 110 can incorporate a RNN such that when a series of data sets are fed into the RNN, it can be trained based on the fed data sets, and it can be determined as to what constitutes normal behavior. Trained RNN can subsequently be configured to classify input data as normal and expected, or as anomalous when the input data sets are fed into the trained RNN. As the volume of anomalous data may be lesser compared to the normal data, training of the RNN for normal data may be performed to enable system 110 to provide an alert whenever any abnormal activity is observed in the future.

FIG. 5B illustrates features selection layer as mentioned above. One or more features of ingested data set can be selected and processed at this layer by processing of one or more variables associated with the data set. The input variables can be processed through techniques such as regression and classification, wherein the output variables, through each technique, can be any or a combination of numerical or categorical, and can accordingly be processed using any or a combination of Pearson's' technique (in case of linear correlation of numerical output variables generated through regression based processing), and Spearman technique (in case of non-linear correlation of numerical output variables generated through regression based processing), and the others as illustrated.

FIG. 5C illustrates further processing of the ingested data sets through feature scaling and dimensionality reduction, wherein the input variables can either be numerical or categorical, and accordingly, different techniques as illustrated can be executed to perform feature scaling and dimensionality reduction.

Figure 6:
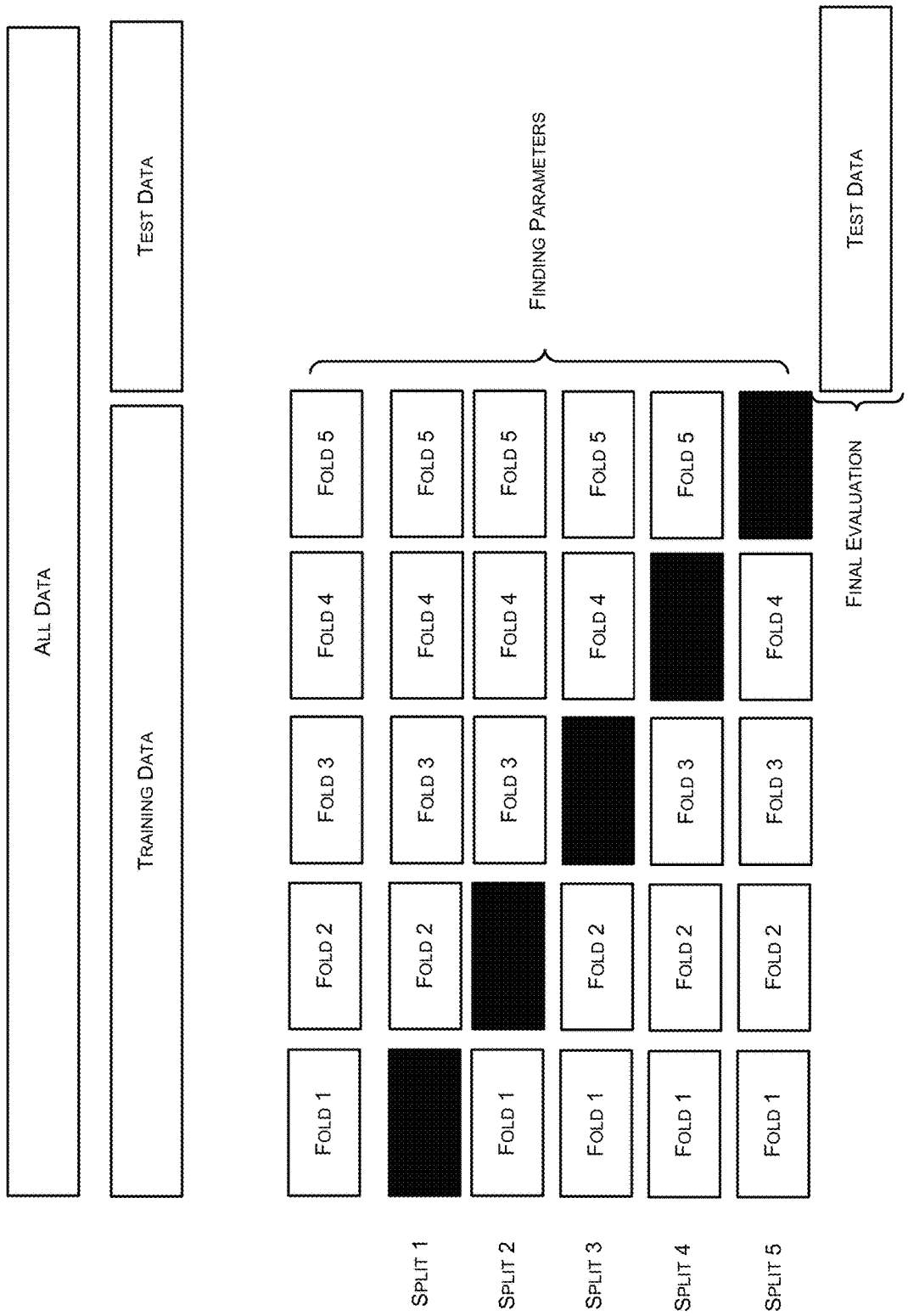
FIG. 6 illustrates cross validation of a matrix, according to an example embodiment of the present disclosure.

FIG. 6 illustrates cross-validation of a matrix, according to an example embodiment of the present disclosure. A ML model parameter may be defined as a configuration variable that can be internal to the ML model, and whose value can be estimated or learnt from the data sets. Such model parameters may be required by the ML model while making predictions, and the model parameters may define the efficiency/performance/accuracy of the ML model on a problem. In an example, the model parameters may not be set manually by a user, and may instead be saved as part of the learnt ML model.

A model hyperparameter may be defined as a configuration that is external to the ML model and whose value cannot be estimated from the data sets. The model hyperparameter may be specified by an entity, and can be used in execution of the ML model to help estimate the model parameters. The model hyperparameter may be set using heuristics, and can be tuned for a given predictive modeling problem. Techniques that may be used to find out hyperparameters include, but are not limited to, any or a combination of Manual Search, Grid Search, Random Search, Bayesian Optimization, and the like.

In an example embodiment, Auto-WEKA (Automatic Waikato Environment for Knowledge Analysis) approach may be used for simultaneous selection of a ML model and associated hyperparameters. The approach may automatically yield optimal ML models for a wide variety of data sets. Auto-sklearn, which is an extension of AutoWEKA that uses Python library scikit-learn, can be a drop-in replacement for regular scikit-learn classifiers and regressors. TPOT (Tree-based Pipeline Optimization Tool) is a data-science assistant that optimizes machine learning pipelines using genetic programming. SMAC (Sequential Model-based Algorithm Configuration) is another example tool for optimizing algorithm parameters or parameters of some other process that can run automatically or a function that can be evaluated, such as a simulation. In another example, H2O MultiML may provide an automated ML model selection and ensembling for the H2O machine learning and data analytics platform, whereas, in yet another example, TransmogrifAI is a Multi-ML library that runs on top of Spark.

In an example embodiment, hold-out may occur when a dataset is split into a 'train' and 'test' set. The train set is what a ML model is trained on, and the test set is used to see how well that trained ML model performs on unseen data sets. A common split when using the hold-out method may include using 80% of data for training and the remaining 20% of the data for testing.

Cross-validation or 'k-fold cross-validation' may be when the dataset is randomly split up into 'k' groups, where one of the groups is used as a test set and the rest are used as a training set. The model may be trained on the training set and scored on the test set, and the process may be repeated until each unique group has been used as the test set. For example, for 5-fold cross-validation, the dataset may be split into 5 groups, and the model may be trained and tested 5 separate times so each group would get a chance to be the test set, as depicted in FIG. 6.

Generally, cross-validation provides the selected ML model an opportunity to train on multiple train-test splits, giving a better indication of how well the ML model may perform on unseen data. Hold-out, on the other hand, is dependent on just one train-test split, which makes the hold-out method dependent on how the data is split into train and test sets. The hold-out technique may be good to use when there is a very large dataset, or when there is a time crunch, or while building an initial ML model. Cross-validation technique uses multiple train-test splits, and hence may require higher computational power and more time to run compared to the holdout technique.

Figure 7A:
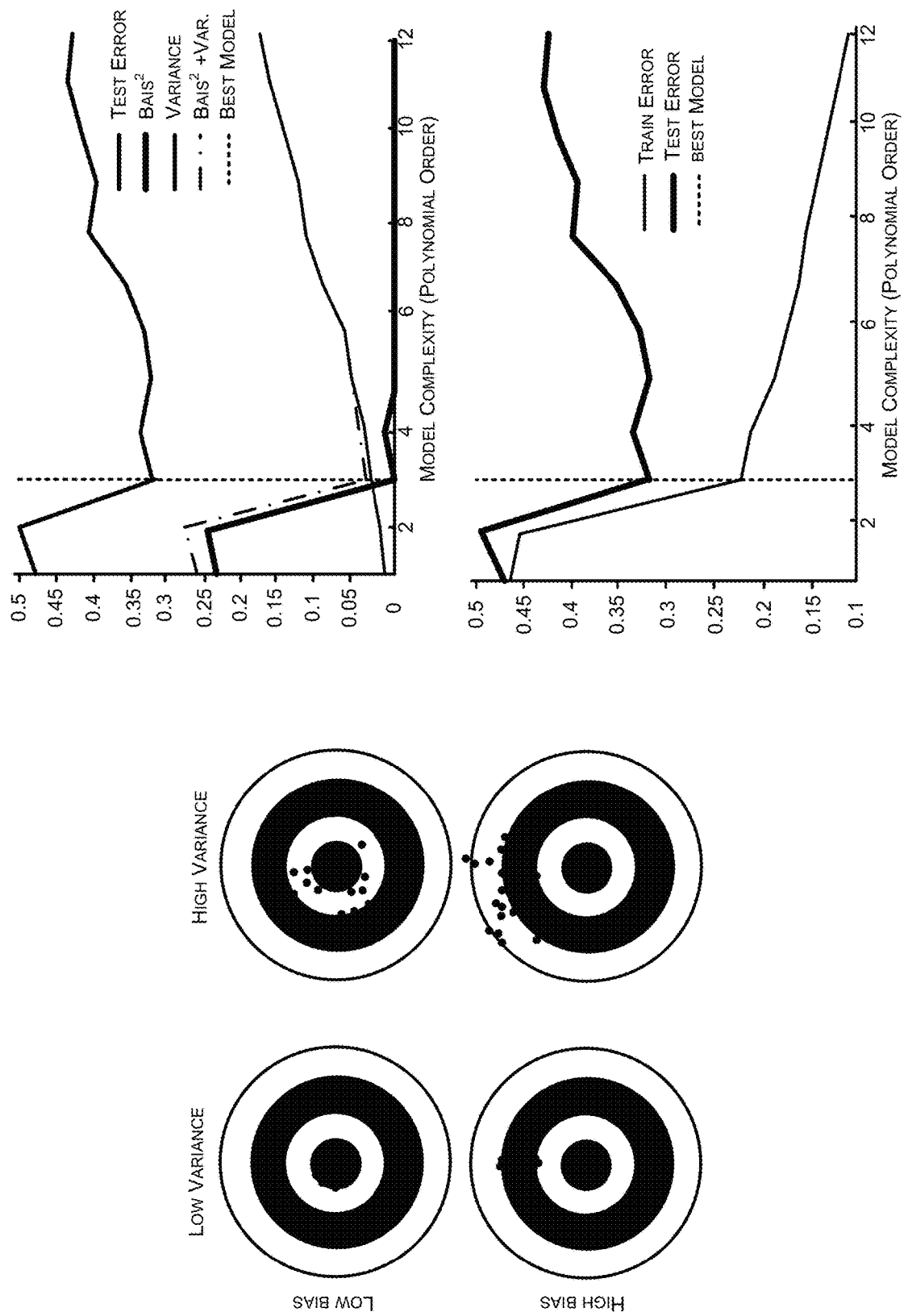
FIGS. 7A, 7B, and 7C illustrate graphs based on implementation of multiple regularization layers, according to an example embodiment of the present disclosure.
Figure 7B:
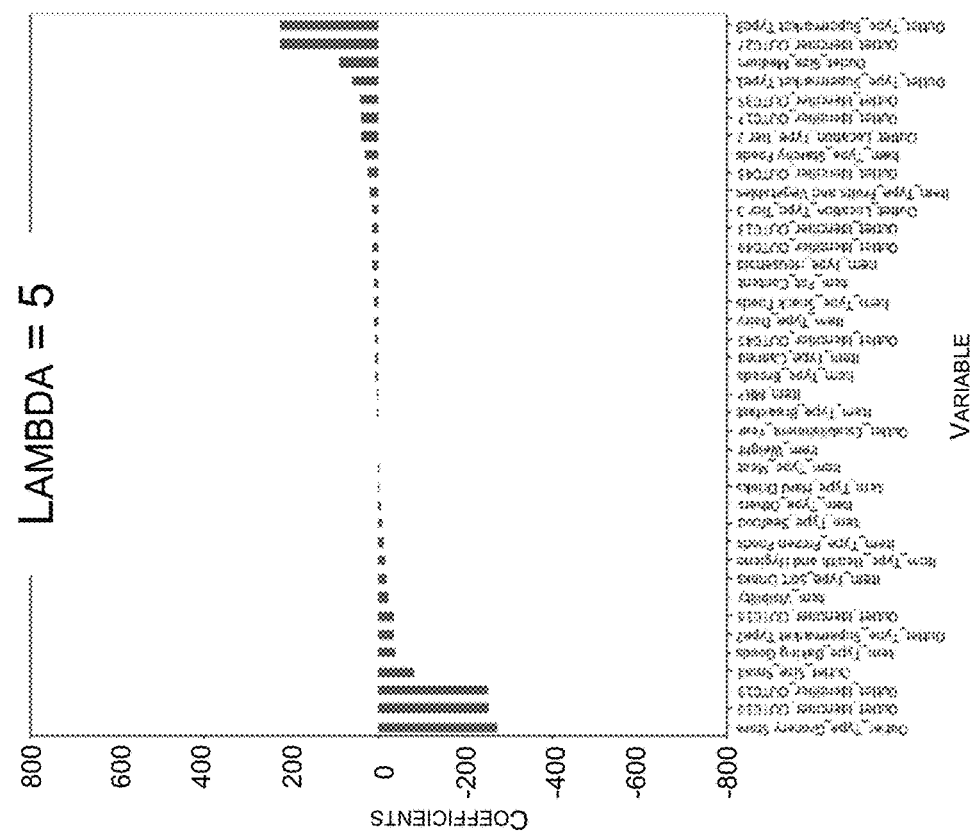
Figure 7B:
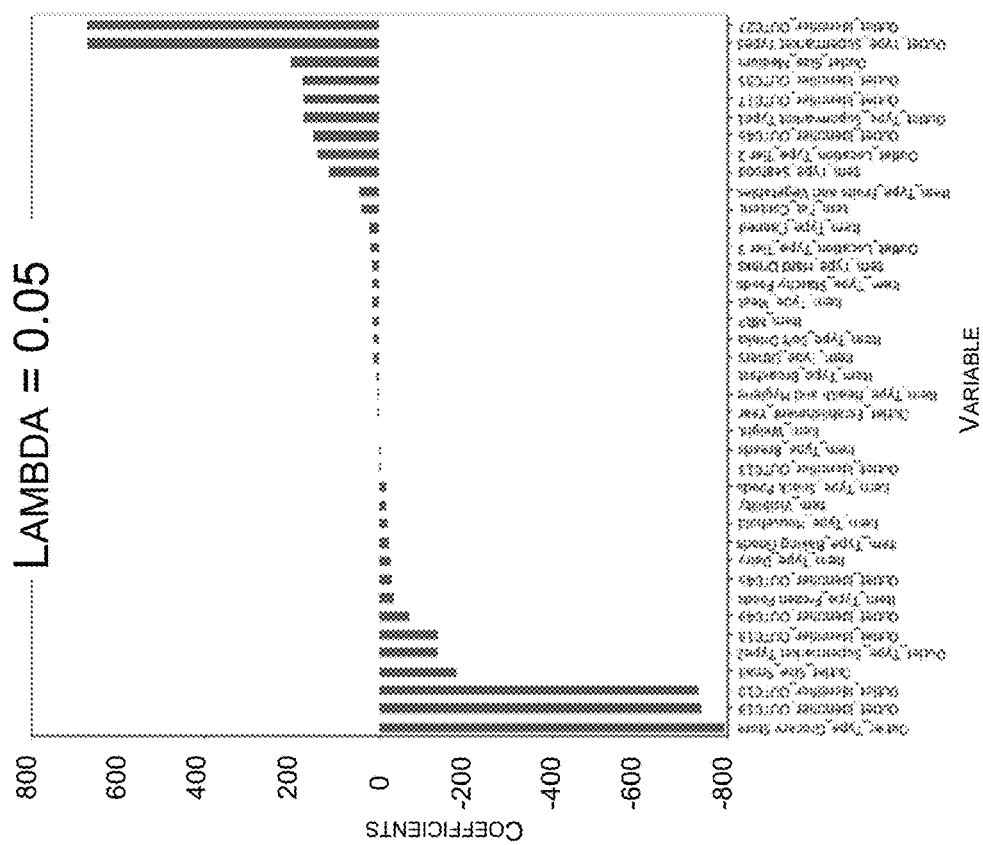
Figure 7C:
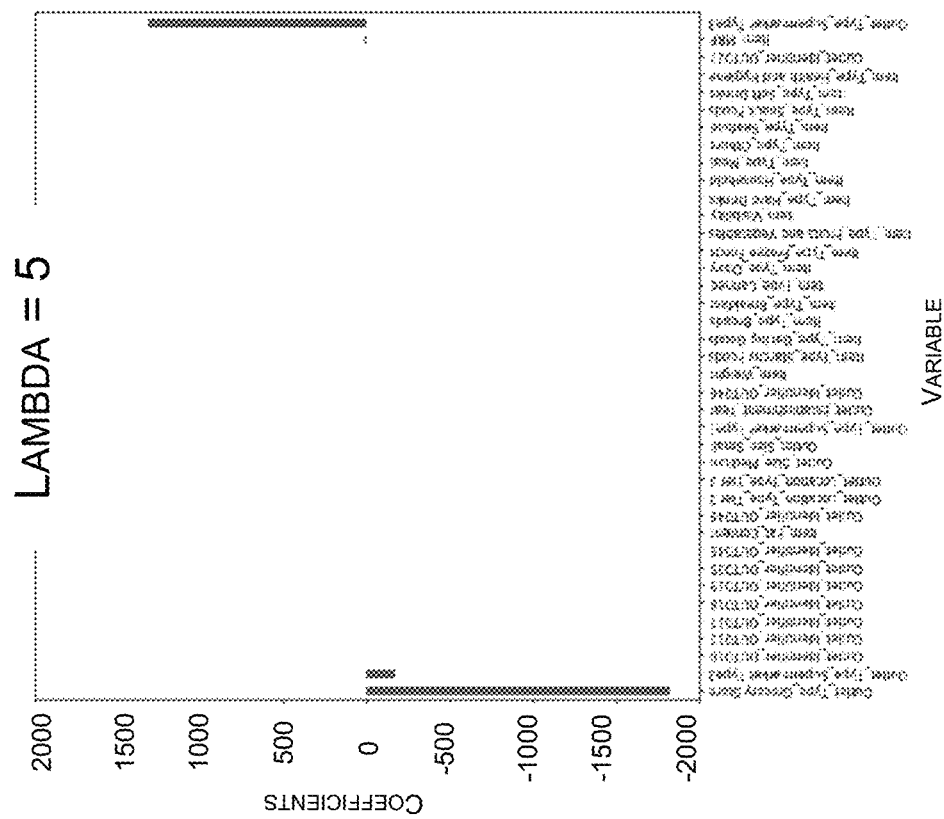
Figure 7C:
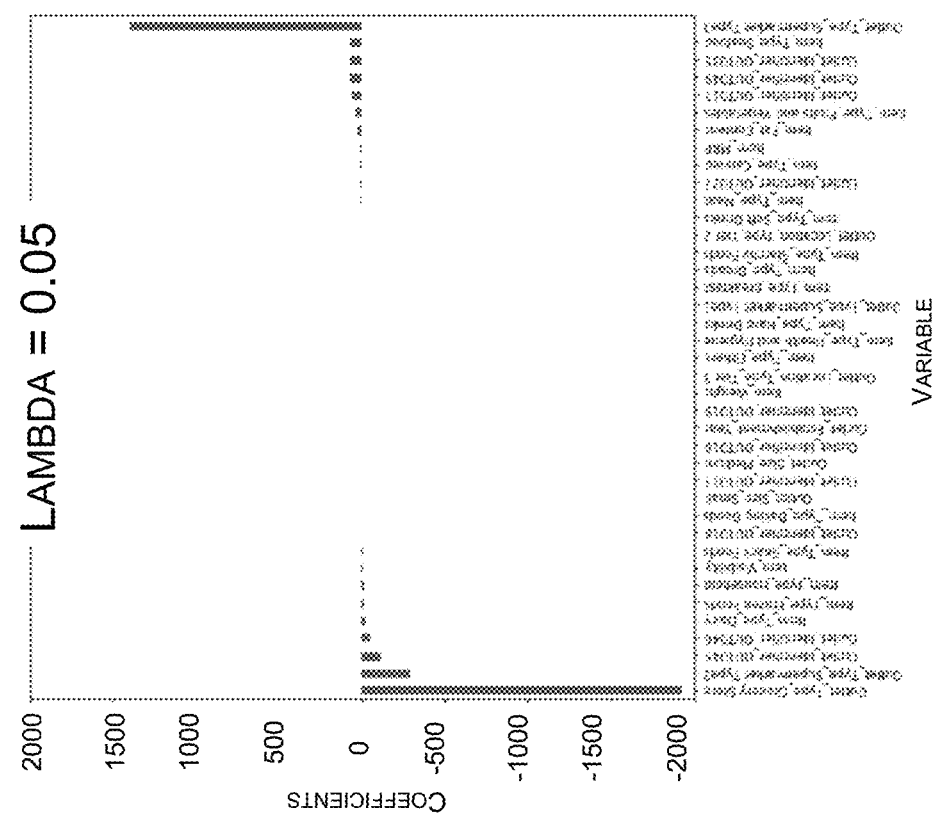

FIGS. 7A, 7B, and 7C illustrate graphs based on implementation of multiple regularization layers, according to an example embodiment of the present disclosure. FIG. 7A depicts layered representation of bias variation trade off implemented on the ingested data sets, and graphical representations of corresponding test error, trial error, bias, variance and their comparison with results of the optimal ML model obtained through the system 110. In an example embodiment, bias variation trade off can be calculated through the following equation as—

$$E[(g(x^*)-y^*)]=E[(g(x^*)-E[(g(x^*)])^2]+[E[(g(x^*)])-f(x^*)]^2+E[(y^*-(f(x^*))^2]$$

Where, $E[(g(x^*)-E[(g(x^*)])^2]$=variance, $[E[(g(x^*)])-f(x^*)]^2$=bias, and $E[(y^*-(f(x^*))^2]$=error.

FIG. 7B illustrates a graphical representation pertaining to regularization-ridge regression, where λ (lambda) is a regularization parameter (shrinkage parameter), and graphs for λ equal to 0.5 and 5 are plotted. Higher the value of λ, the more restricted are the values of individual coefficients. Therefore, selecting the right value of the λ is important, and cross-validation technique may be used to pickup the right value. The value can be obtained using an objective function as—

$$\min(SS\text{residuals}+\lambda\|\theta\|_2)$$

FIG. 7C illustrates graphical representation pertaining to regularization-lasso regression, where graphs for λ equal to 0.5 and 5 are plotted. Higher the value of λ, the more restricted are the values of individual coefficients. Moreover, Lasso yields sparse ML models that may force some coefficients to be 0 for sufficiently large lambda. Here, the right value of λ can be obtained using an objective function as—

$$\min(SS\text{residuals}+\lambda\|\theta\|_1)$$

Figure 8:
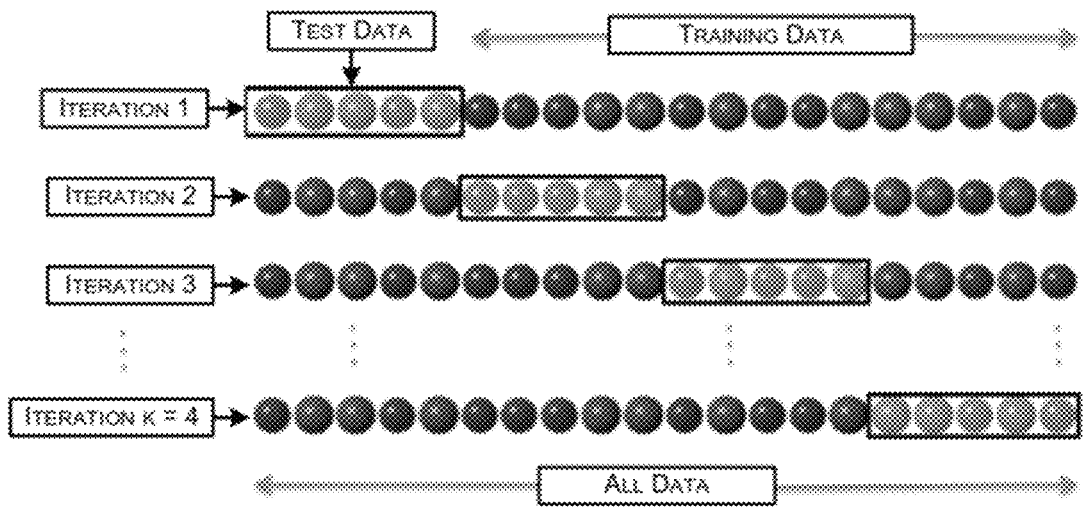
FIG. 8 illustrates cross validation for identifying right lambda, according to an example embodiment of the present disclosure.
Figure 8:
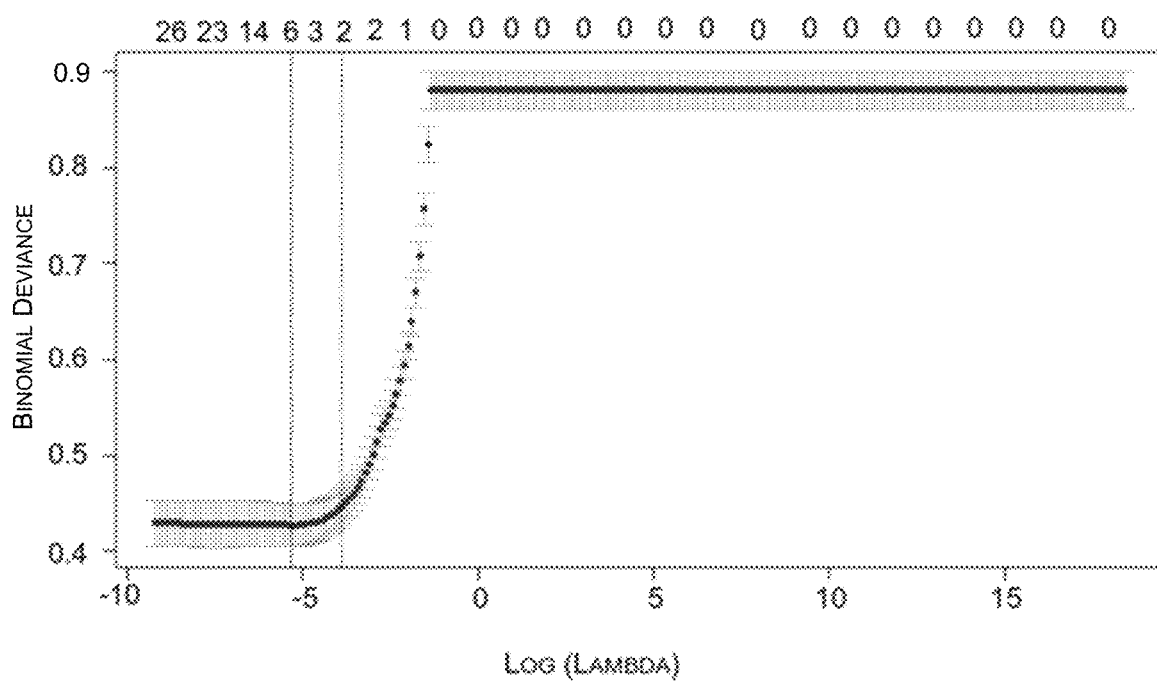

Further, cross-validation can be carried out for identifying the right value of λ, and the corresponding graph is being illustrated in FIG. 8. In an example embodiment, cross-validation can be carried out using the following algorithm—

```
# Package
library(glmnet)
# Assume train and test samples ready
train_mat<- model.matrix(FLAG~.,train)
# Cross Validation
lambdas<- 10^seq(8,-4, length = 250)
model_lasso<- glmnet(train_mat,train_y,alpha = 1, lambda = lambdas,
family = "binomial")
lasso.cv <- cv.glmnet(train_mat, train_y,alpha = 1, lambda = lambdas,
family = "binomial")
plot(lasso.cv)
lambda_lasso<- lasso.cv$lambda.min
#View coefficients
coeff<- predict(model_lasso, type="coefficients",s=lambda_lasso)
Print(coeff)
plot(coeff)
# Prediction
test_mat<- model.matrix(FLAG~.,test)
test_pred<- predict(model_lasso, s=lambda_lasso, newx = test_mat,
type = "response")
```

Figures 9A, 9B:
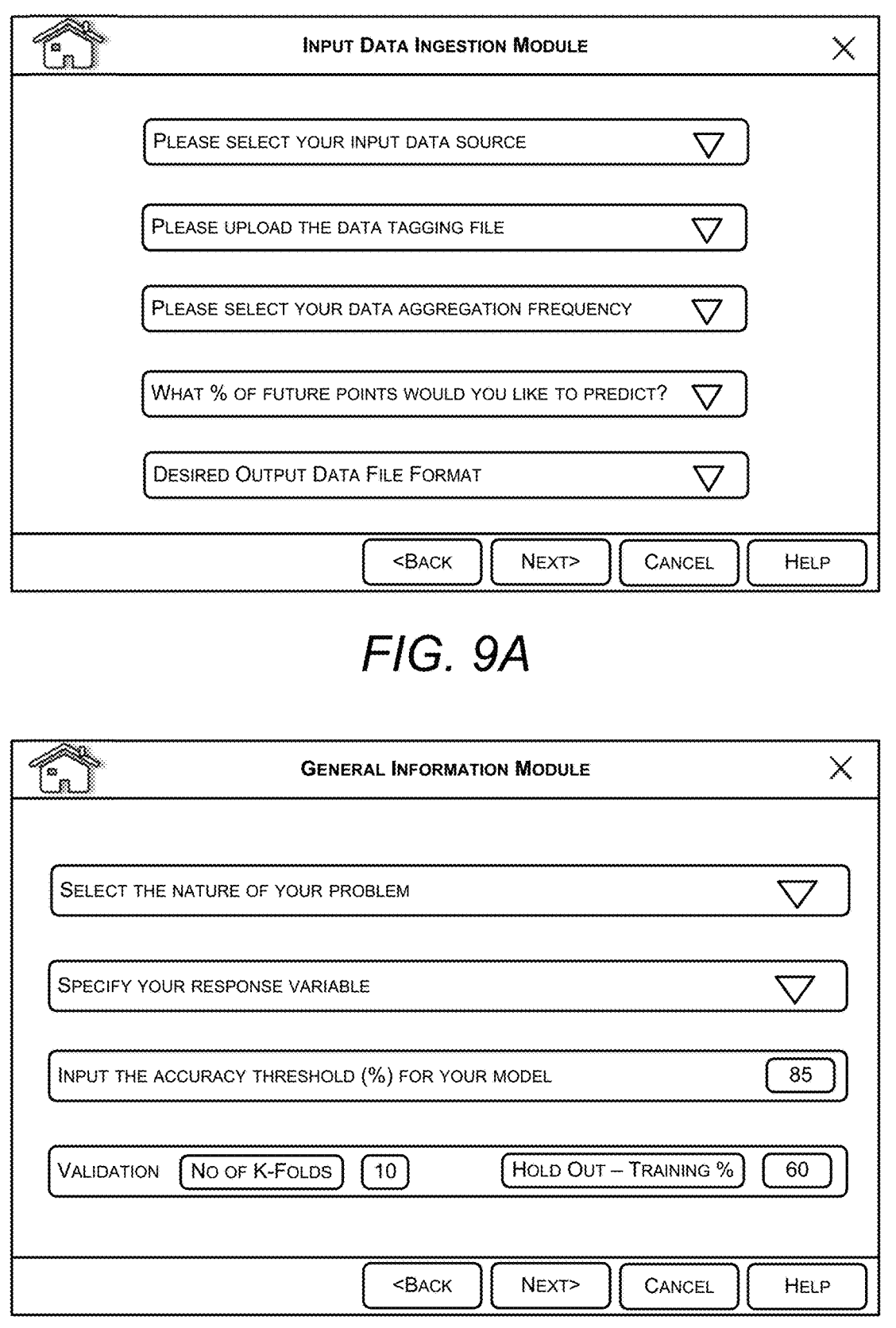
Figure 9C:
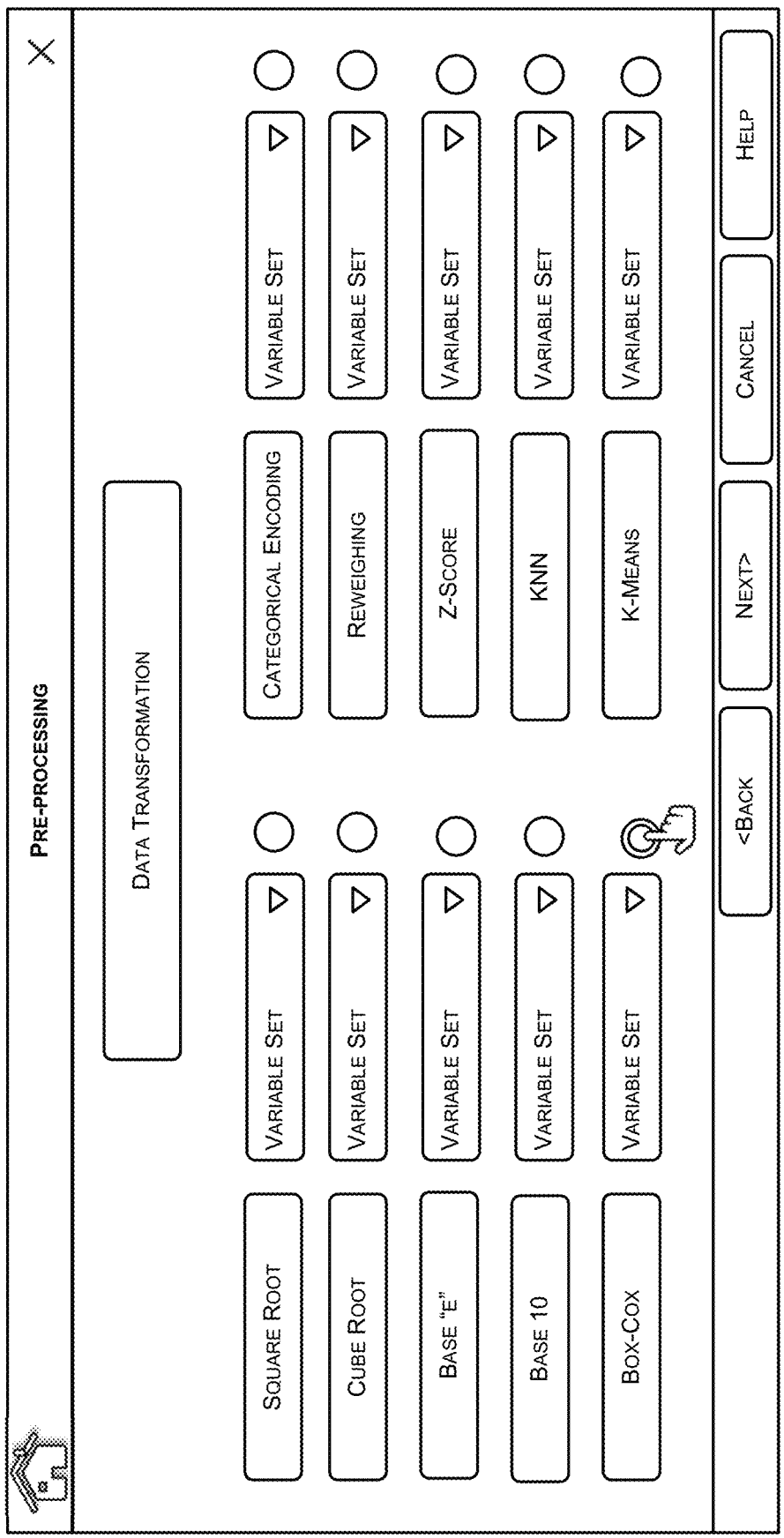

FIGS. 9A to 9H illustrate an implementation of the proposed system for predictive analysis from a data scientist perspective, according to an example embodiment of the present disclosure. System 110 can be implemented in the form of a client-side interface that may provide multiple display tabs enabling a user to access the proposed system 110, choose his/her role, and select various parameters. FIG. 9A shows an example manner in which data sets can be ingested from, say a data lake, along with requesting the user to provide any or a combination of a tagging file, data aggregation frequency, percentage of future points that the user would like to predict, and desired output file format.

Figure 9D:
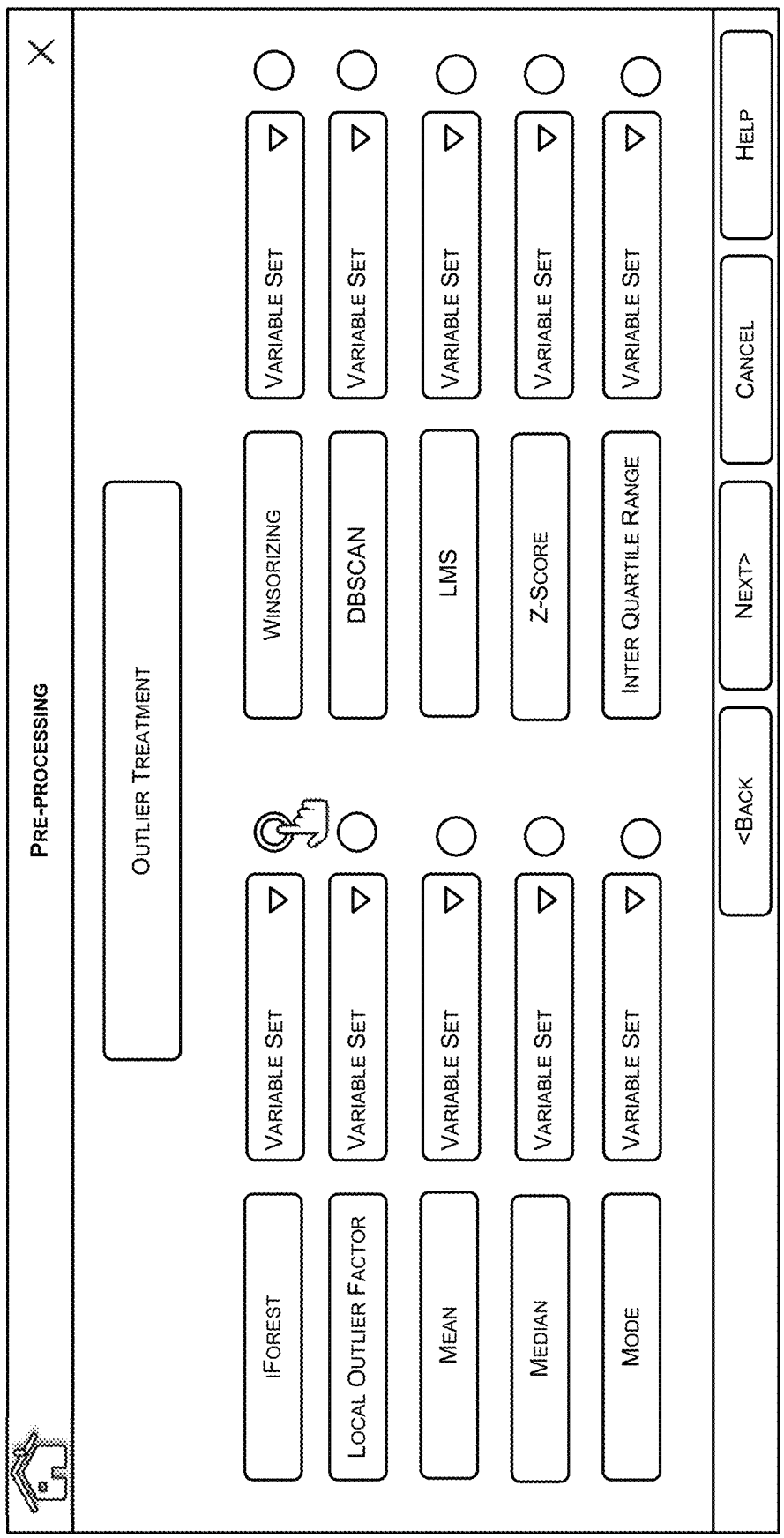
Figure 9E:
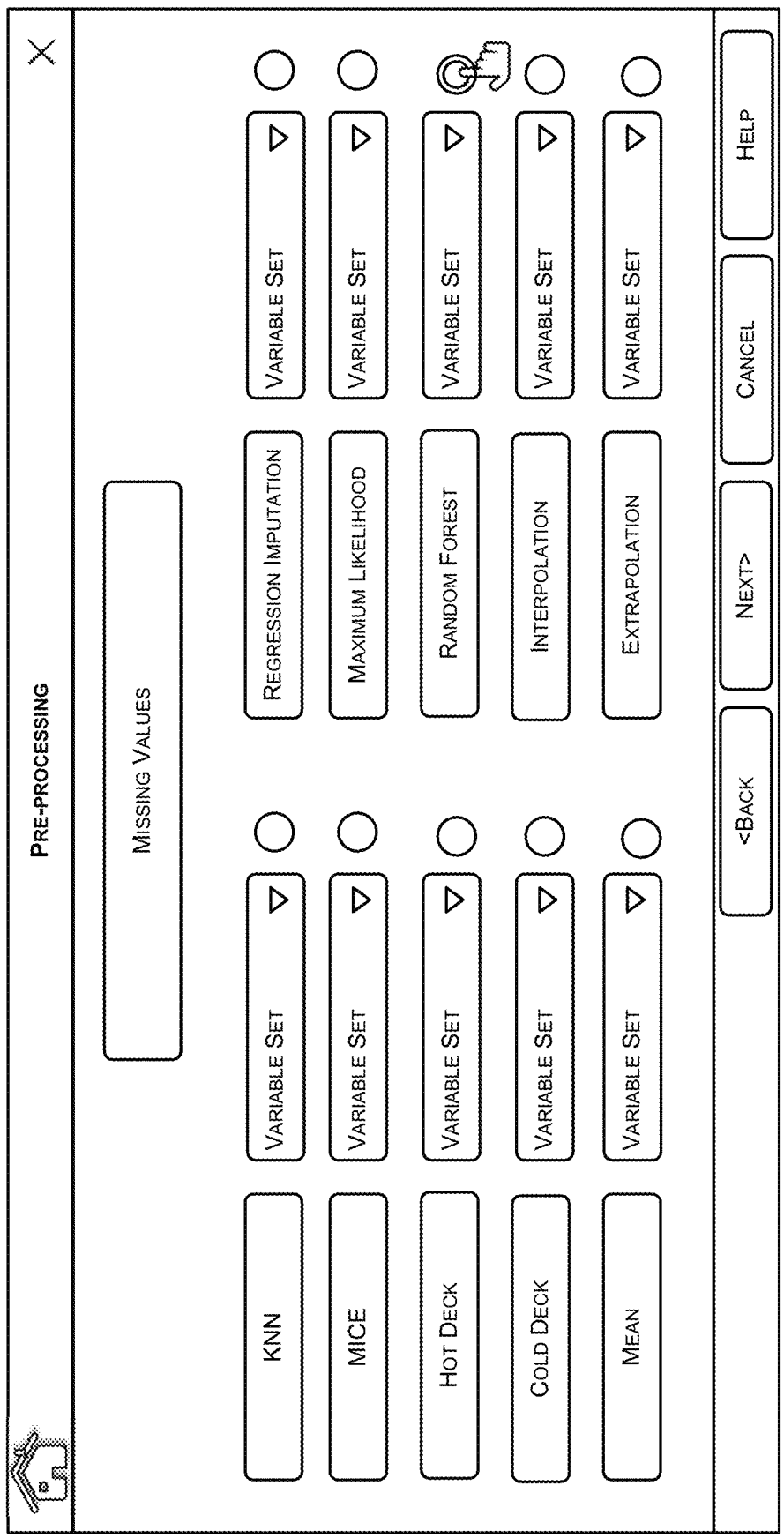
Figure 9F:
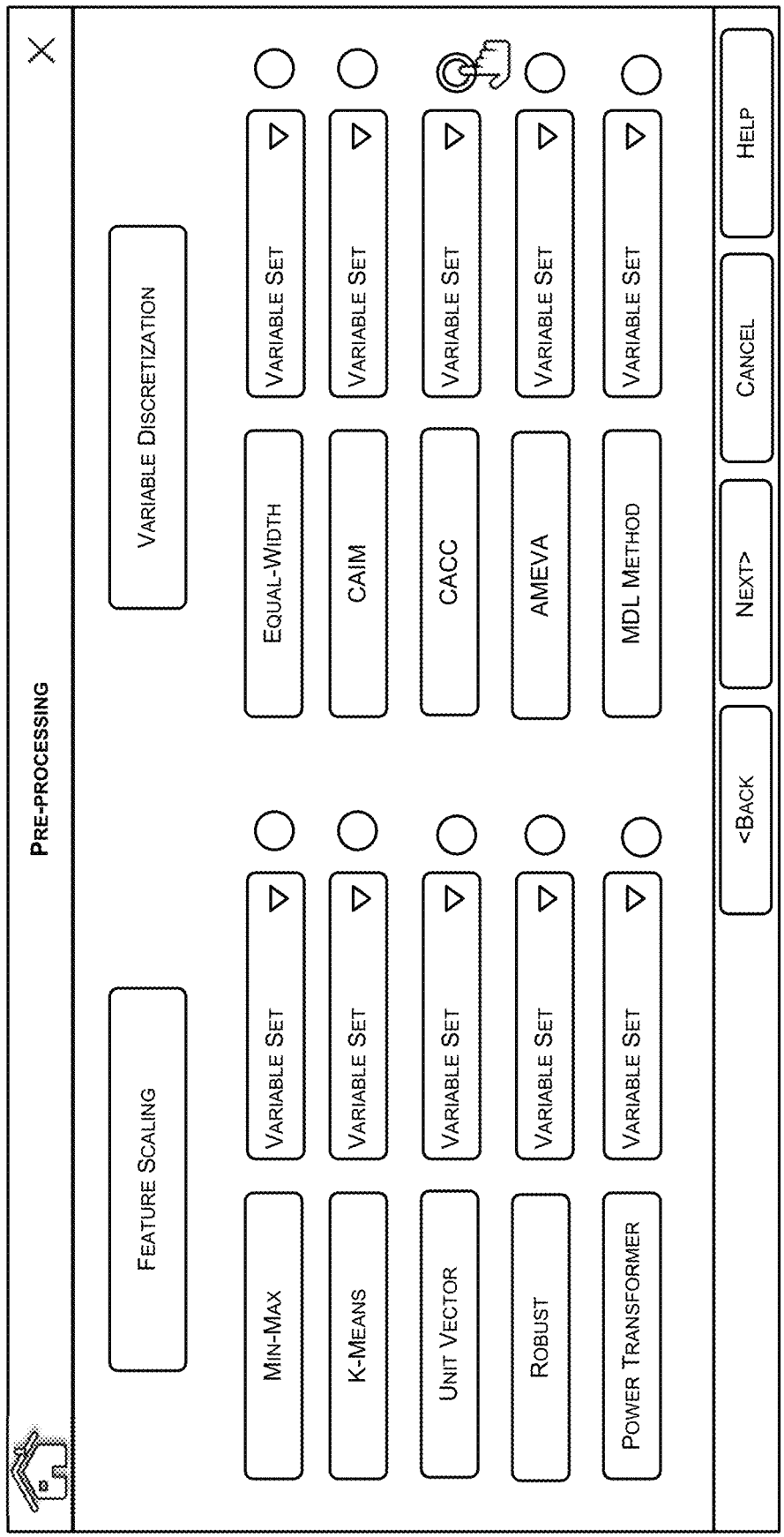
Figure 9G:
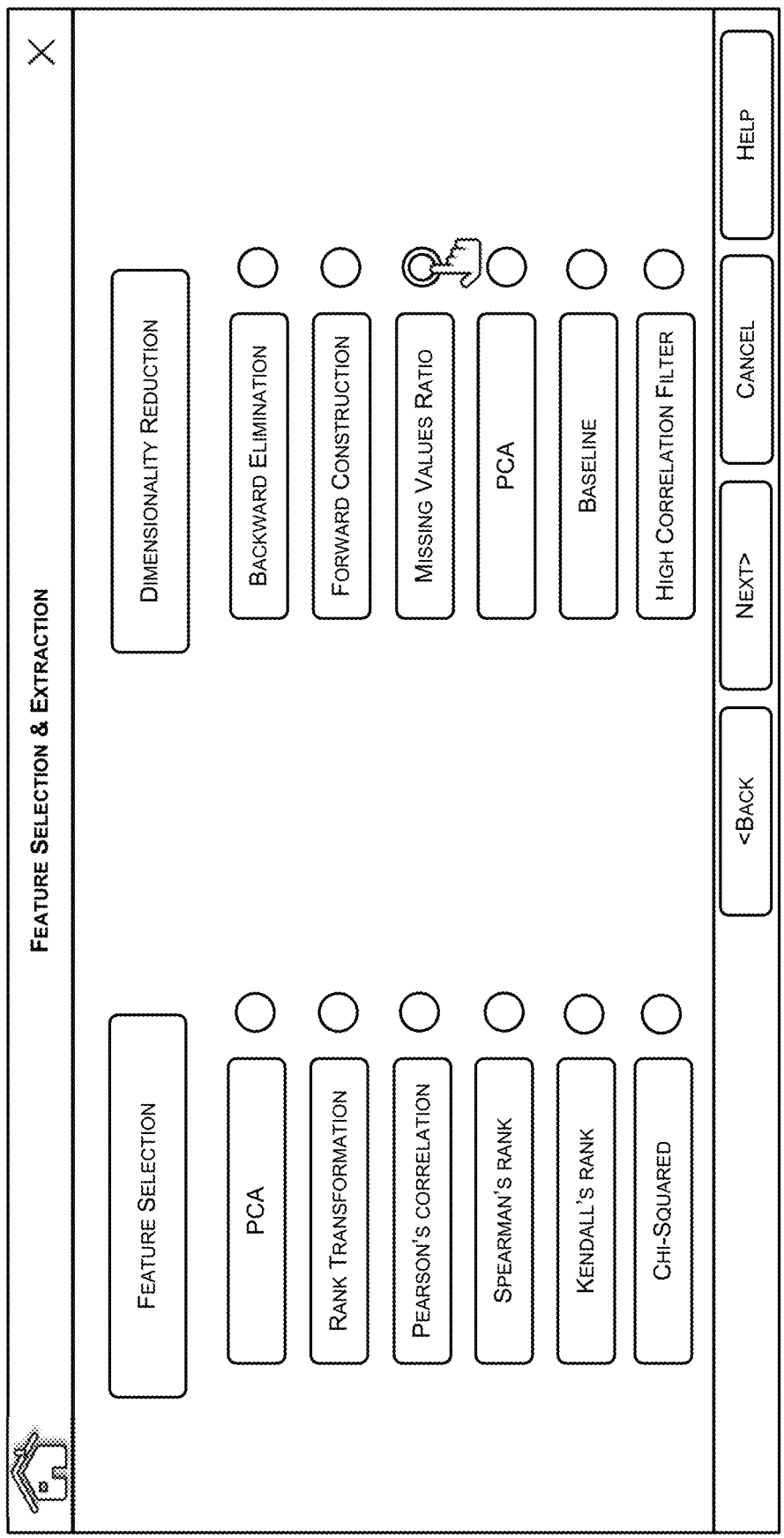

FIG. 9B shows an example manner in which any or a combination of problem information, response variable, desired accuracy threshold, and validation/hold-out training based parameters can be received from the user. FIG. 9C shows an example manner where transformation, as explained above, of the ingested data sets can be performed as part of pre-processing of the data sets. FIG. 9D shows an example manner in which outlier assessment, as explained above, on the processed/transformed/ingested data sets can be performed, post which, any or a combination of, feature selection, feature extraction, missing value, feature scaling, and dimensionality reduction treatments, as shown in FIGS. 9E to 9G, can be undertaken as part of the pre-processing exercise. FIG. 9H shows an example interface through which a ML technique can be selected, post which the selected ML model can be executed on the processed data sets to perform predictive analysis on the data sets, along with performance assessment of the selected ML model.

In an example embodiment, for the modules including Data Transformation, Outlier Treatment, Missing Values, and ML Module list, in case a user chooses a technique/techniques that is/are less than 50% of the default number of techniques for that particular module (this is determined by the proposed ML engine—the default technique list), a pop-up may be configured/generated, for example, at the "Help" button. Such a pop-up when clicked upon, can display the default techniques, based on which a data scientist can then choose 50% of those techniques in addition to the technique that the data scientist might have chosen (which may not be a part of the default technique).

Figure 10A:
FIGS. 10A to 10D illustrate implementation of the proposed system for predictive analysis from business user perspective, according to an example embodiment of the present disclosure.
Figure 10B:
Figure 10C:
Figure 10D:

FIGS. 10A and 10B illustrate example representations showing data tagging and ingestion of data sets based on which, in FIGS. 10C and 10D, one or more user preference parameters associated with predictive analysis on the ingested data sets can be received.

Figure 11:
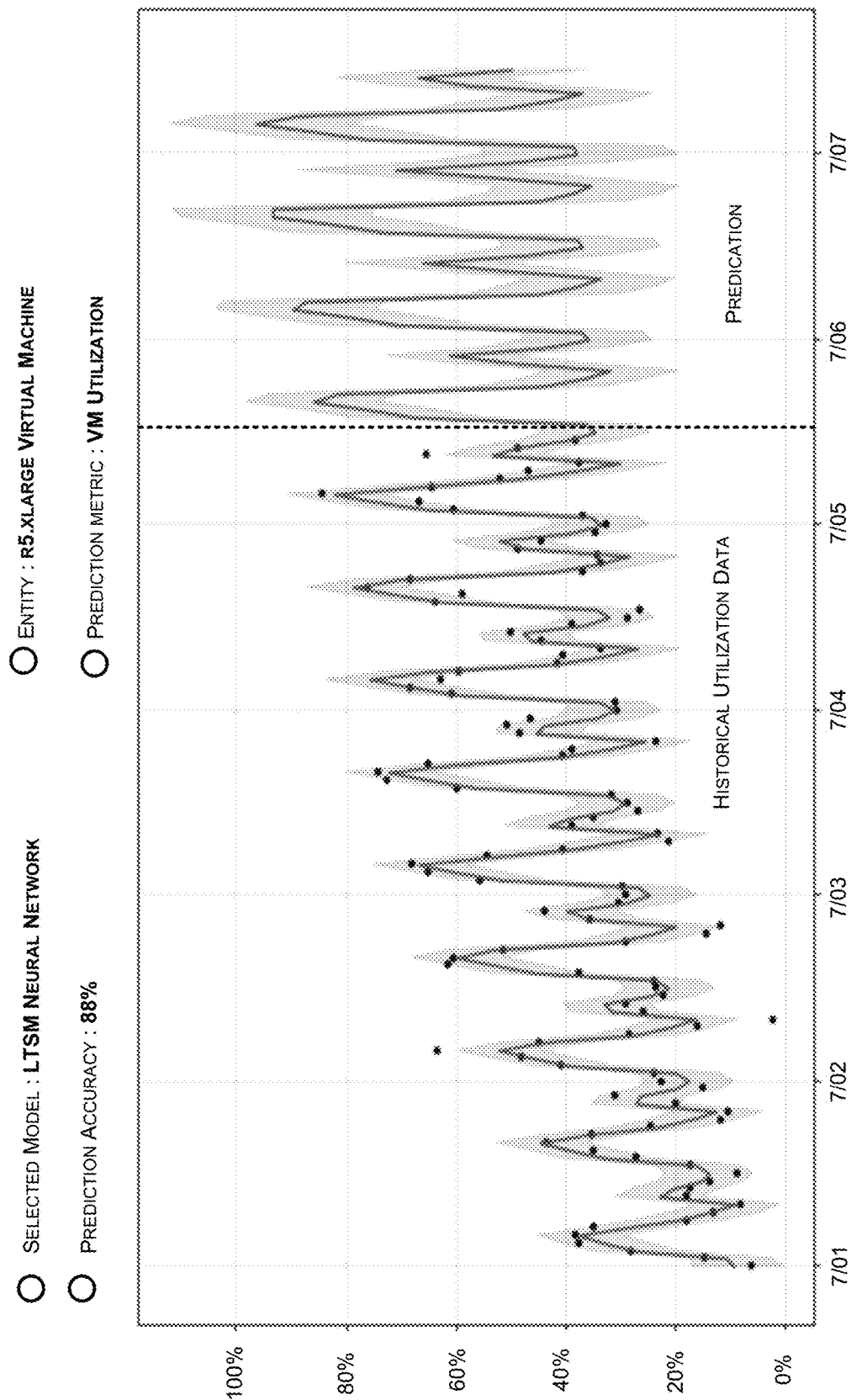
FIG. 11 illustrates output of the proposed system for predictive analysis, according to an example embodiment of the present disclosure.

FIG. 11 illustrates an example output of the proposed system 110 for carrying out predictive analysis, according to an example embodiment of the present disclosure. In a cloud deployment, for example, LSTM neural network model may be selected such that cloud utilization data may be ingested to S3 (Simple Storage Service) buckets on a 24 hour basis (data frequency maybe hourly or any other desired time interval). Minimal data pre-processing may be involved given that there are almost no missing values, no transformations, and <1% outliers. In the present case, data can be temporal in nature and the LTSM Neural Network model may work at its best with an accuracy of >85% for the next 3 days (72 hour period), and whose output may be depicted as in the example graphical representation of FIG. 11.

Figure 12:
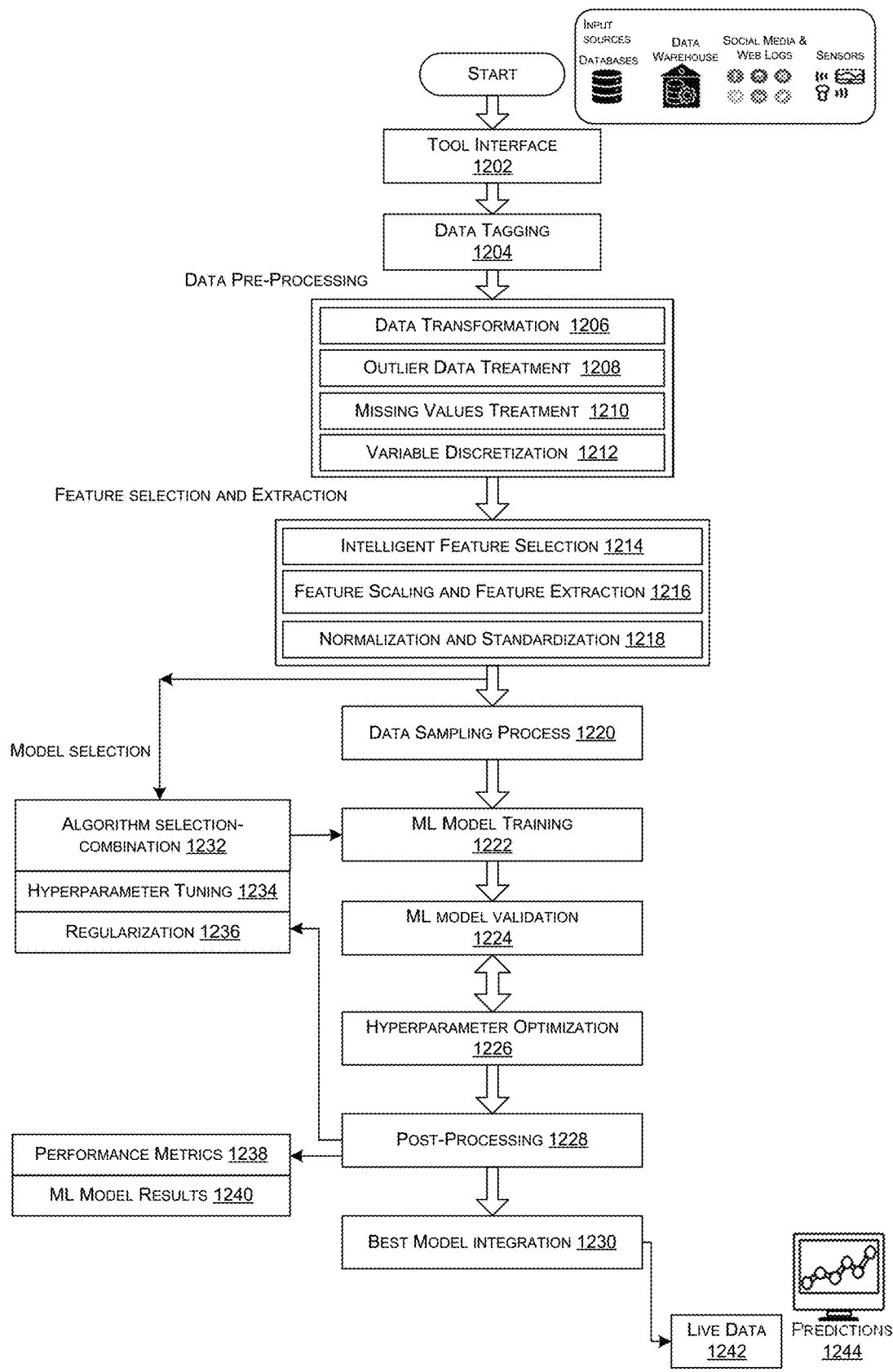
FIG. 12 illustrates an implementation flow of the proposed system for predictive analysis, according to an example embodiment of the present disclosure.

FIG. 12 illustrates an implementation flow of the proposed system for predictive analysis, according to an example embodiment of the present disclosure. System 110 can be configured to provide a tool interface 1202 to receive/ingest data sets from a data lake, based on which, the ingested data sets can be tagged at 1204. Data sets may then be pre-processed through any or a combination of data transformation 1206, outlier data treatment 1208, missing values treatment 1210, and variable discretization 1212.

Post the pre-processing of the ingested data sets, feature selection and extraction can be performed through any or a combination of intelligent feature selection 1214, feature selection and feature extraction 1216, and normalization and standardization 1218. System 110 can thereafter be configured to facilitate selection of ML model based on any or a combination of algorithm selection-combination block 1232, hyperparameter tuning 1234, and regularization 1236. In parallel, the data sets can be sampled at 1220, and ML model training can be performed at 1222 using the sampled data sets (test and training data sets). The selected ML model can subsequently be validated at 1224, followed optionally by hyperparameter optimization 1226, and post-processing of the output (results pertaining to ML model performance, and output parameters associated with execution of the ML model) at block 1228. The output can also be given back as feedback to the ML selection block so that performance evaluation of the ML model can be performed based on performance metrics 1238 and results 1240 obtained by executing the ML model), and a second ML model is selected in case the performance of the current ML model does not meet the accuracy threshold. Once the optimal ML model is selected, ML model integration 1230 can be performed, and live data sets 1242 can be processed using the selected optimal ML model in order to perform predictive analysis at 1244.

Figure 13:
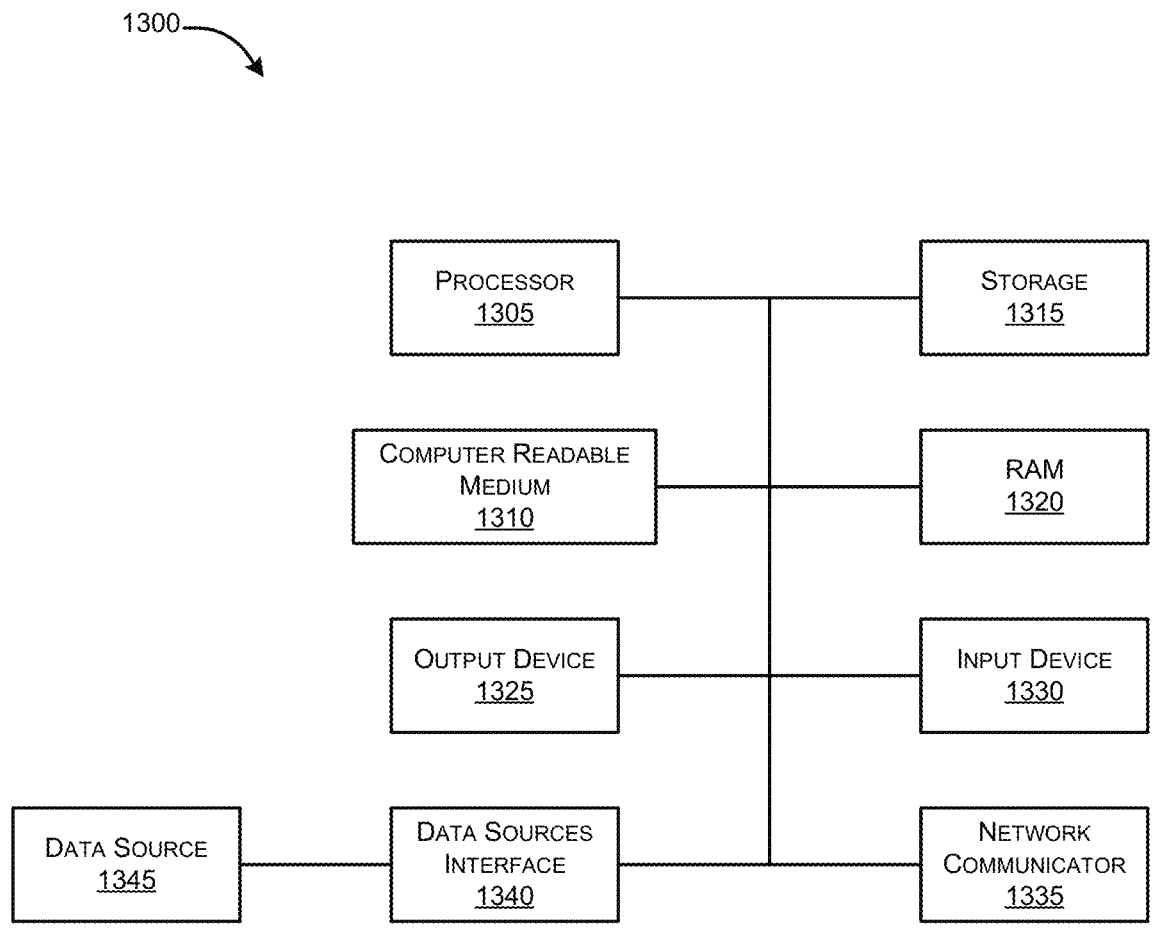
FIG. 13 illustrates a hardware platform for implementation of the system, according to an example embodiment of the present disclosure.

FIG. 13 illustrates a hardware platform 1300 for the implementation of the system 110 of FIG. 1, according to an example embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 1300. As illustrated, the hardware platform 1300 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 1300 may be a computer system such as the system 110 that may be used with the embodiments described herein. The computer system may represent a computational platform that includes components that may be in a server or another computer system. The computer system may execute, by the processor 1305 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1305 that executes software instructions or code stored on a non-transitory computer-readable storage medium 1310 to perform methods of the present disclosure. The software code includes, for example, instructions to gather data and documents and analyze documents. In an example, the model selector and evaluator 130, the data lake 140, and the data analyzer 150 may be software codes or components performing these steps.

The instructions on the computer-readable storage medium 1310 are read and stored the instructions in storage 1315 or in random access memory (RAM). The storage 1315 may provide a space for keeping static data where at least some instructions could be stored for later execution. The stored instructions may be further compiled to generate other representations of the instructions and dynamically stored in the RAM such as RAM 1320. The processor 1305 may read instructions from the RAM 1320 and perform actions as instructed.

The computer system may further include the output device 1325 to provide at least some of the results of the execution as output including, but not limited to, visual information to users, such as external agents. The output device 1325 may include a display on computing devices and virtual reality glasses. For example, the display may be a mobile phone screen or a laptop screen. GUIs and/or text may be presented as an output on the display screen. The computer system may further include an input device 1330 to provide a user or another device with mechanisms for entering data and/or otherwise interact with the computer system. The input device 1330 may include, for example, a keyboard, a keypad, a mouse, or a touchscreen. Each of these output device 1325 and input device 1330 may be joined by one or more additional peripherals. For example, the output device 1325 may be used to display the results of the model selector and evaluator 130, the data lake 140, and the data analyzer 150.

A network communicator 1335 may be provided to connect the computer system to a network and in turn to other devices connected to the network including other clients, servers, data stores, and interfaces, for instance. A network communicator 1335 may include, for example, a network adapter such as a LAN adapter or a wireless adapter. The computer system may include a data sources interface 1340 to access the data source 1345. The data source 1345 may be an information resource. As an example, a database of exceptions and rules may be provided as the data source 1345. Moreover, knowledge repositories and curated data may be other examples of the data source 1345.

Figure 14:
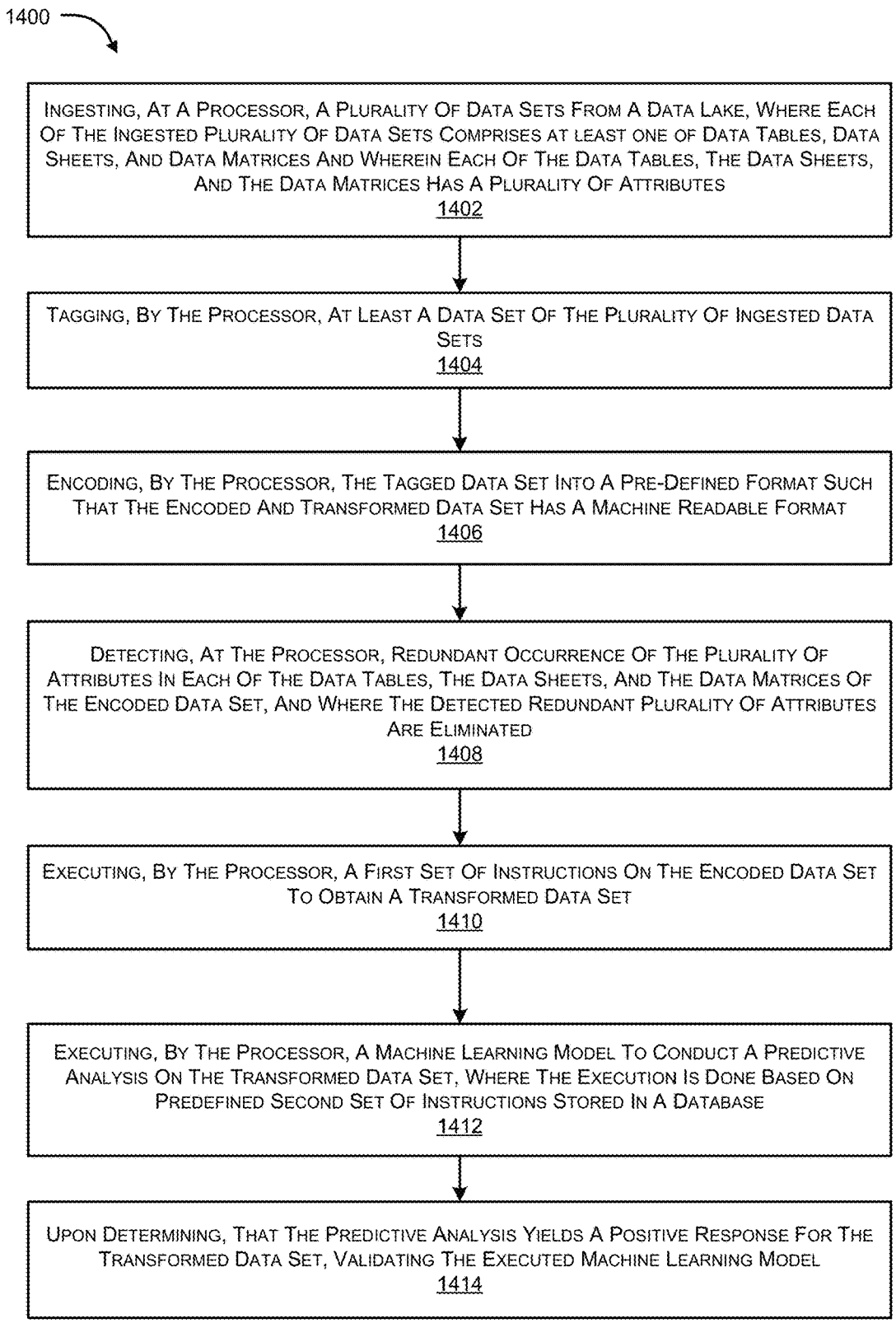
FIG. 14 illustrates a process flowchart for predictive analysis, according to an example embodiment of the present disclosure.

FIG. 14 illustrates a process flowchart for the system, according to an example embodiment of the present disclosure.

The order in which method 1400 is described is not intended to be construed as a limitation, and any number of the described method blocks may be combined or otherwise performed in any order to implement method 1400, or an alternate method. Additionally, individual blocks may be deleted from method 1400 without departing from the spirit and scope of the present disclosure described herein. Furthermore, method 1400 may be implemented in any suitable hardware, software, firmware, or a combination thereof, that exists in the related art or that is later developed.

The method 1400 describes, without limitation, the implementation of the system 110. A person of skill in the art will understand that method 1400 may be modified appropriately for implementation in various manners without departing from the scope and spirit of the disclosure. The method 1400 may be implemented, in at least some embodiments, by the data analyzer 150 of the system 110. For example, data analyzer 150 may use the processor(s) to execute computer instructions to pre-process ingested data sets, based on which, model selector and evaluator 130 may facilitate predictive analysis of the ingested data sets through a selected ML model.

The method 1400 can include the step 1402 of ingesting, from a data lake having large volume of data sets, a plurality of data sets. Each data set of the data lake may include at least one of data tables, data sheets, and data matrices. Each of the data tables, the data sheets, and the data matrices may have a plurality of attributes including at least one of a row, a column, and a list.

At step 1404, the method can further include the step of configuring a data analyzer to tag at least one data set of the plurality of ingested data sets, and at step 1406, encode the tagged data set into a pre-defined format. The encoded data set may have a machine-readable format.

At step 1408, the method can further include the step of enabling the data analyzer to process the encoded data set so as to detect redundant occurrence of the plurality of attributes in each of the data tables, the data sheets, and the data matrices of the encoded data set, wherein the detected redundant plurality of attributes may be eliminated. At step 1410, the method can further include the step of configuring the data analyzer to execute a first set of instructions on the encoded data set to obtain a transformed data set.

At step 1412, the method can include the step of configuring a model selector and evaluator to, based on a second set of instructions, execute a ML model to conduct predictive analysis on the transformed data set. Based on a confirmation that the predictive analysis yields a positive response for the transformed data set, the proposed method can, at step 1414, enable validation of the executed ML model.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system for predictive analysis, the system comprising:
   a processor;
   memory storing instructions, which when executed by the processor, cause the system to:
      ingest, at a data lake, a plurality of data sets received from at least one of social media, web logs, and sensors, where each of the ingested plurality of data sets comprises of at least one of data tables, data sheets, and data matrices, and wherein each of the data tables, the data sheets, and the data matrices has a plurality of attributes including at least one of a row, a column, and a list;
      tag at least a data set of the plurality of ingested data sets;
      encode the tagged data set into a pre-defined format such that the encoded data set has a machine-readable format;
      parse the encoded data to detect redundant occurrence of the plurality of attributes in each of the data tables, the data sheets, and the data matrices of the encoded data set, wherein the detected redundant plurality of attributes are eliminated;
      execute a first set of instructions on the encoded data set to obtain a transformed data set;
      identify a machine learning (ML) model from a set of pre-stored machine learning models where the execution is done based on predefined second set of instructions stored in a database, wherein the ML model is identified based on at least one of an ability of the ML model to capture constant metamorphosis of input data sets, prediction accuracy of the ML model, ability of the ML model to capture long term and short-term trends and seasonality, training time and performance of the ML model, requirement of amount and type of available data by the ML model, and length of forecast horizon;
      split the transformed data set into a plurality of groups, wherein the machine learning model is tested using one of the plurality of groups and trained with the remaining groups, wherein the steps of training and testing are repeated until each group of plurality of groups is used as test data set, where the step of training and testing is performed to conduct a predictive analysis on the transformed data set;
      determine performance pertaining to anomalous data detection, false positives, and deployment time for the predictive analysis;
      upon determining, that the predictive analysis yields a positive response for the transformed data set, validate the machine learning model based on performance metrics and accuracy of the predictive analysis according to a user-defined universal criteria comprising at least one of Root Mean Square Error (RMSE), mean absolute error (MAE), mean absolute percentage error (MAPE), and confusion matrix;
      transmit the performance metrics of the predicted analysis to the user; and
      wherein the processor further is to calculate hyper parameters and tune the hyper parameters with the encoded dataset using at least one of a grid search and a bayesian optimization, wherein the hyper-parameters correspond to a configuration external to the ML model, wherein values of the hyper-parameters are not estimated from the datasets.

2. The system as claimed in claim 1, wherein upon determining that the predictive analysis yields a negative response for the transformed data set, invalidate the machine learning model.

3. The system as claimed in claim 1, wherein the processor is to:
   evaluate performance of a machine learning model by at least one of a regularization and bias variance trade off based on factors including at least one of interpretability, simplicity, speed, and stability.

4. The system as claimed in claim 3, wherein the machine learning model is validated based on the evaluated performance.

5. The system as claimed in claim 1, wherein a new machine learning model is tested with a sample dataset, trained with a training data set, and corresponding model results and performance evaluation metrics are validated by matching with a validation dataset, wherein the new model is maintained at the database.

6. The system as claimed in claim 1, wherein the processor is to allow a user to select a parameter associated with the ingested data sets, the parameter including at least one of a threshold, an accuracy, a relevant variable, and a prediction error range.

7. The system as claimed in claim 1, wherein the first set of instructions are executed to facilitate scaling, dimension reduction of the encoded data set by reducing dimensionality of space associated with the redundant plurality of attributes, and conversion of the encoded data set from continuous form to discrete form.

8. The system as claimed in claim 1, wherein the data lake comprises staging zones for incoming data, the staging zones comprising:
    transient data zone to hold ephemeral datasets;
    raw data zone to encrypt and secure the ingested datasets; and
    refined data zone to accommodate enriched and manipulated datasets.

9. A method for predictive analysis, the method comprising:
    ingesting, by a processor, from a data lake, a plurality of data sets received from at least one of social media, web logs, and sensors, where each of the ingested plurality of data sets comprises of at least one of data tables, data sheets, and data matrices and wherein each of the data tables, the data sheets, and the data matrices has a plurality of attributes including at least one of a row, a column, and a list;
    tagging, by the processor, at least a data set of the plurality of ingested data sets;
    encoding, by the processor, the tagged data set into a pre-defined format such that the encoded data set has a machine-readable format;
    parsing, by the processor, the encoded data to detect redundant occurrence of the plurality of attributes in each of the data tables, the data sheets, and the data matrices of the encoded data set, and where the detected redundant plurality of attributes are eliminated;
    executing, by the processor, a first set of instructions on the encoded data set to obtain a transformed data set;
    identifying, by the processor, a machine learning (ML) model from a set of pre-stored machine learning models, where the execution is done based on pre-defined second set of instructions stored in a database, wherein the ML model is identified based on at least one of an ability of the ML model to capture constant metamorphosis of input data sets, prediction accuracy of the ML model, ability of the ML model to capture long term and short-term trends and seasonality, training time and performance of the ML model, requirement of amount and type of available data by the ML model, and length of forecast horizon;
    splitting, by the processor, the transformed data set into a plurality of groups, wherein the machine learning model is tested using one of the plurality of groups and trained with the remaining groups, wherein the steps of training and testing are repeated until each group of plurality of groups is used as test data set, where the step of training and testing is performed to conduct a predictive analysis on the transformed data set;
    determining, by the processor, performance pertaining to anomalous data detection, false positives, and deployment time for the predictive analysis;
    upon determining, that the predictive analysis yields a positive response for the transformed data set, validating, by the processor, the machine learning model based on performance metrics and accuracy of the predictive analysis according to a user-defined universal criteria comprising at least one of Root Mean Square Error (RMSE), mean absolute error (MAE), mean absolute percentage error (MAPE), and confusion matrix;
    transmitting, by the processor, the performance metrics of the predicted analysis to the user; and
    calculating hyper parameters and tuning the hyper parameters with the encoded dataset using at least one of a grid search and a bayesian optimization, wherein the hyper-parameters correspond to a configuration external to the ML model, wherein values of the hyper-parameters are not estimated from the datasets.

10. The method as claimed in claim 9, further comprising:
    upon determining, that the predictive analysis yields a negative response for the transformed data set, invalidate the machine learning model.

11. The method as claimed in claim 9, further comprising:
    evaluate performance of a machine learning model by at least one of regularization and bias variance trade off based on factors including at least one of interpretability, simplicity, speed, and stability.

12. The method as claimed in claim 11, further comprising:
    validating the machine learning model based on the evaluated performance.

13. The method as claimed in claim 9, further comprising:
    testing, by the processor, a new machine learning model with a sample dataset;
    training, by the processor, the machine learning model with a training data set, and
    validating, by the processor, corresponding model results and performance evaluation metrics by matching with validation dataset,
    wherein the new model is maintained at the database.

14. The method as claimed in claim 9, further comprising:
    allowing a user to select a parameter associated with the ingested data sets, the parameter including at least one of a threshold, an accuracy, relevant variables, and a prediction error range.

15. The method as claimed in claim 9, further comprising:
    executing, by the processor, the first set of instructions to facilitate scaling, dimension reduction of the encoded data set by reducing dimensionality of space associated with the redundant plurality of attributes, and conversion of the encoded data set from continuous form to discrete form.

16. A non-transitory computer readable medium comprising machine executable instructions that are executable by a processor to:
    ingest, from a data lake, a plurality of data sets received from at least one of social media, web logs, and sensors, where each of the ingested plurality of data sets comprises of at least one of data tables, data sheets, and data matrices and wherein each of the data tables, the data sheets, and the data matrices has a plurality of attributes;
    tag at least a data set of the plurality of ingested data sets;

encode the tagged data set into a pre-defined format such that the encoded data set has a machine-readable format;

parse the encoded data to detect redundant occurrence of the plurality of attributes in each of the data tables, the data sheets, and the data matrices of the encoded data set, and where the detected redundant plurality of attributes are eliminated;

execute a first set of instructions on the encoded data set to obtain a transformed data set;

identify a machine learning (ML) model from a set of pre-stored machine learning models, where the execution is done based on predefined second set of instructions stored in a database, wherein the ML model is identified based on at least one of an ability of the ML model to capture constant metamorphosis of input data sets, prediction accuracy of the ML model, ability of the ML model to capture long term and short-term trends and seasonality, training time and performance of the ML model, requirement of amount and type of available data by the ML model, and length of forecast horizon;

split the transformed data set into a plurality of groups, wherein the machine learning model is tested using one of the plurality of groups and trained with the remaining groups, wherein the steps of training and testing are repeated until each group of plurality of groups is used as test data set, where the step of training and testing is performed to conduct a predictive analysis on the transformed data set;

determine performance pertaining to anomalous data detection, false positives, and deployment time for the predictive analysis;

upon determining, that the predictive analysis yields a positive response for the transformed data set, validate the machine learning model based on performance metrics and accuracy of the predictive analysis according to a user-defined universal criteria comprising at least one of Root Mean Square Error (RMSE), mean absolute error (MAE), mean absolute percentage error (MAPE), and confusion matrix;

transmit the performance metrics of the predicted analysis to the user and wherein the processor further is to calculate hyper parameters and tune the hyper parameters with the encoded dataset using at least one of a grid search and a bayesian optimization, wherein the hyper-parameters correspond to a configuration external to the ML model, wherein values of the hyper-parameters are not estimated from the datasets.

17. The non-transitory computer readable medium as claimed in claim 16, upon determining, that the predictive analysis yields a negative response for the transformed data set, invalidate the machine learning model.

18. The non-transitory computer readable medium as claimed in claim 16, wherein a new machine learning model is tested with a sample dataset, trained with a training data set, and corresponding model results and performance evaluation metrics are validated by matching with a validation dataset, wherein the new model is maintained at the database.

\* \* \* \* \*